(12) United States Patent
Dhodapkar et al.

(10) Patent No.: US 12,321,919 B1
(45) Date of Patent: Jun. 3, 2025

(54) CONTEXT-BASED ACTIONS FROM MATRIX CODES

(71) Applicant: Block, Inc., Oakland, CA (US)

(72) Inventors: Ashutosh Sham Dhodapkar, Fremont, CA (US); Dino Dai Zovi, Brooklyn, NY (US)

(73) Assignee: Block, Inc., Oakland, CA (US)

( * ) Notice: Subject to any disclaimer, the term of this patent is extended or adjusted under 35 U.S.C. 154(b) by 127 days.

(21) Appl. No.: 17/824,273

(22) Filed: May 25, 2022

Related U.S. Application Data

(63) Continuation of application No. 16/698,613, filed on Nov. 27, 2019, now Pat. No. 11,386,418.

(51) Int. Cl.
  *G06Q 20/32* (2012.01)
  *G06Q 20/36* (2012.01)

(52) U.S. Cl.
  CPC ..... *G06Q 20/3276* (2013.01); *G06Q 20/3224* (2013.01); *G06Q 20/3672* (2013.01)

(58) Field of Classification Search
  None
  See application file for complete search history.

(56) References Cited

U.S. PATENT DOCUMENTS

| | | | | |
|---|---|---|---|---|
| 10,223,664 | B2 * | 3/2019 | Gillen | G06Q 30/0635 |
| 10,713,634 | B1 * | 7/2020 | McBride | G06Q 20/38215 |
| 10,839,369 | B1 * | 11/2020 | Mossoba | G06Q 20/10 |
| 11,386,418 | B1 | 7/2022 | Dhodapkar et al. | |
| 2013/0166441 | A1 | 6/2013 | Kobylkin et al. | |
| 2015/0161589 | A1 | 6/2015 | Snider et al. | |
| 2015/0213435 | A1 * | 7/2015 | Douglas | G06Q 20/3821 705/64 |
| 2018/0268409 | A1 * | 9/2018 | Guo | G06Q 30/06 |

(Continued)

FOREIGN PATENT DOCUMENTS

WO  WO-2015105688 A1 *  7/2015  ............. G06Q 20/12

OTHER PUBLICATIONS

J. Gao, V. Kulkarni, H. Ranavat, L. Chang and H. Mei, "A 2D Barcode-Based Mobile Payment System," 2009 Third International Conference on Multimedia and Ubiquitous Engineering, 2009, pp. 320-329, doi: 10.1109/MUE.2009.62 (Year: 2009).*

(Continued)

*Primary Examiner* — Gregory S Cunningham, II
(74) *Attorney, Agent, or Firm* — Polsinelli PC

(57) ABSTRACT

In one embodiment, techniques include a payment service computing platform associated with a payment service and methods performed thereby. Techniques include receiving, from a first electronic device of a first user, an instruction to associate a token corresponding to a matrix barcode with an action involving a first account. Techniques include associating the token with the action and the first account. Techniques include receiving, from a second electronic device of a second user, the token and a first set of contextual information. Techniques include identifying the action based at least in part on the token and the first set of contextual information. Techniques include causing a user interface to be displayed on the second electronic device, including interface elements for collecting payment information from the second user. Techniques include initiating the payment to the first user based on the payment information.

20 Claims, 15 Drawing Sheets

(56) References Cited

U.S. PATENT DOCUMENTS

| | | |
|---|---|---|
| 2018/0350144 A1 | 12/2018 | Rathod |
| 2019/0347666 A1 | 11/2019 | Bermudez-Cisneros et al. |
| 2020/0027076 A1* | 1/2020 | Sharma .............. G06Q 20/3278 |
| 2021/0042724 A1 | 2/2021 | Rathod |

OTHER PUBLICATIONS

J. Gao et al., "A 2D Barcode-Based Mobile Payment System," 2009 Third International Conference on Multimedia and Ubiquitous Engineering, 2009, pp. 320-329, (Year: 2009).

* cited by examiner

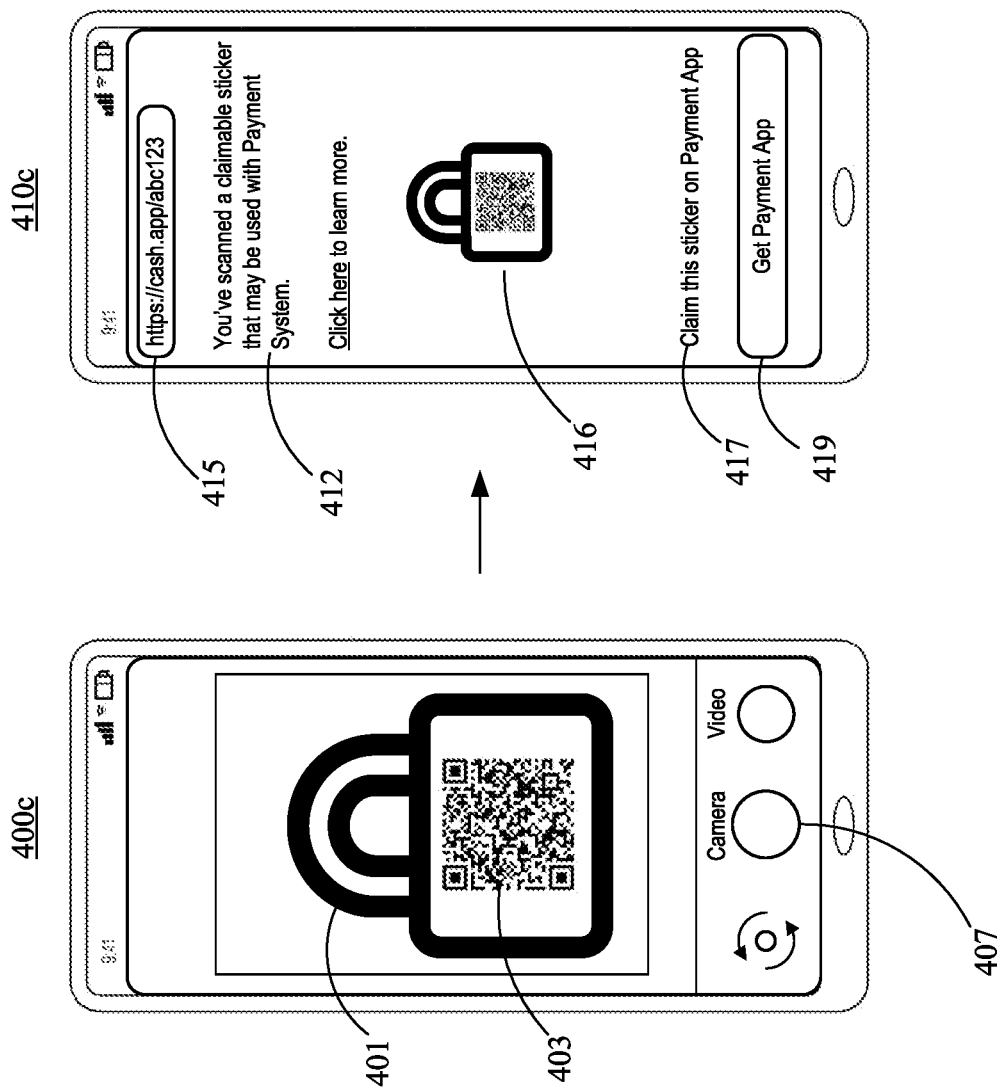

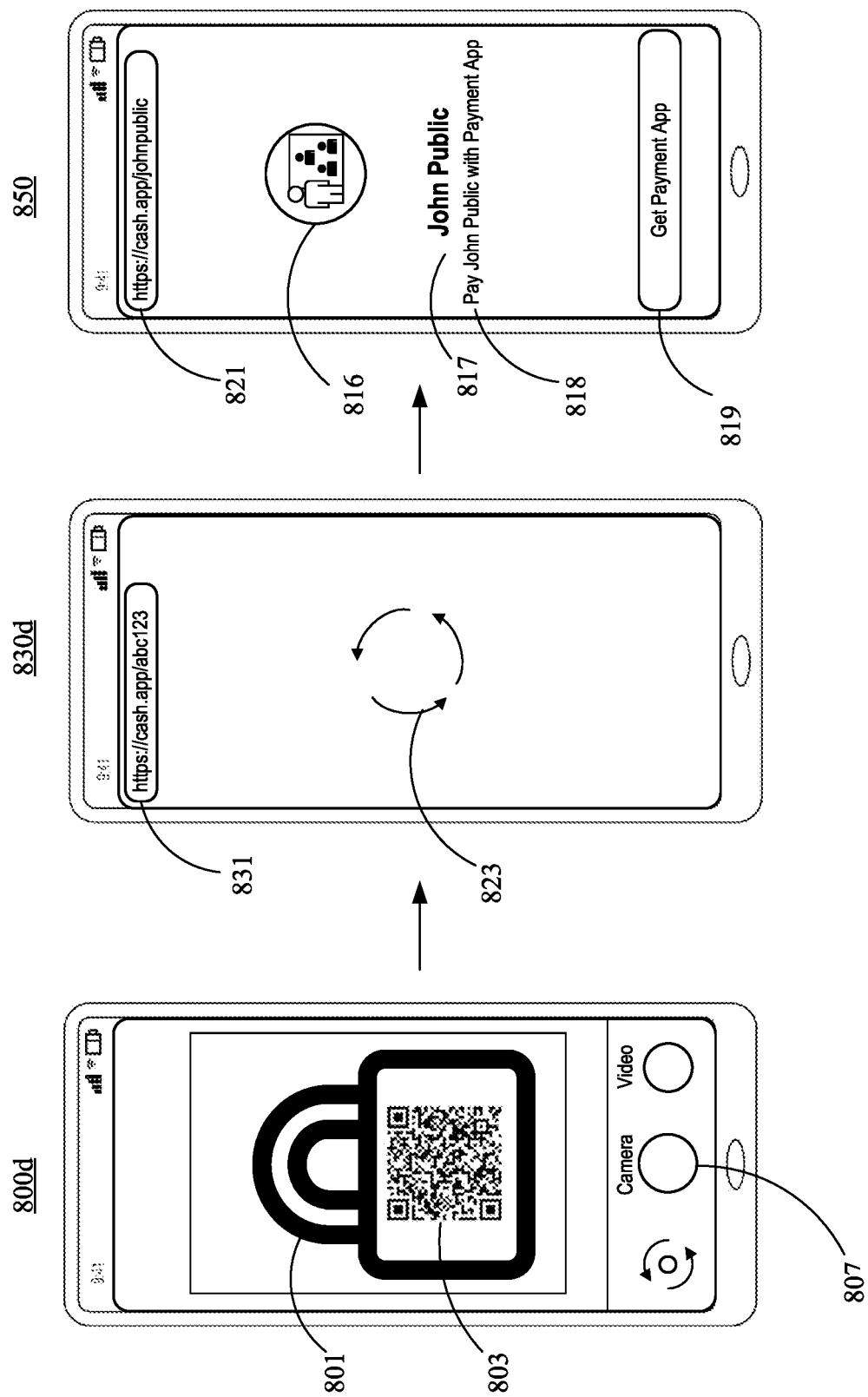

CONTEXT-BASED ACTIONS FROM MATRIX CODES

PRIORITY

This application is a continuation under 35 U.S.C. § 120 of U.S. patent application Ser. No. 16/698,613, filed 27 Nov. 2019.

BACKGROUND

Matrix barcodes, also known as two-dimensional barcodes, are machine-readable optical labels that may store a variety of information. Often, matrix barcodes store information about an object to which it is attached. Because of their two-dimensional nature, matrix barcodes can store significantly more information than a standard barcode. Increasingly, matrix barcodes have found a use in payments technology. A matrix barcode may be generated to include information about a transaction, such as the identity of the payee, an amount of the transaction etc. In this usage, the details of the transaction must often be known prior to the creation of the matrix barcode, because traditional matrix barcodes cannot be modified to include updated information.

BRIEF DESCRIPTION OF THE DRAWINGS

Features of the present disclosure, its nature and various advantages, will be more apparent upon consideration of the following detailed description, taken in conjunction with the accompanying drawings.

FIGS. 4A-4C illustrate example user interfaces relating to associating a pre-generated matrix barcode with an account action.

FIGS. 8A-8D illustrate example user interfaces relating to interacting with a matrix barcode to perform account actions.

DESCRIPTION OF EXAMPLE EMBODIMENTS

Figure 1:
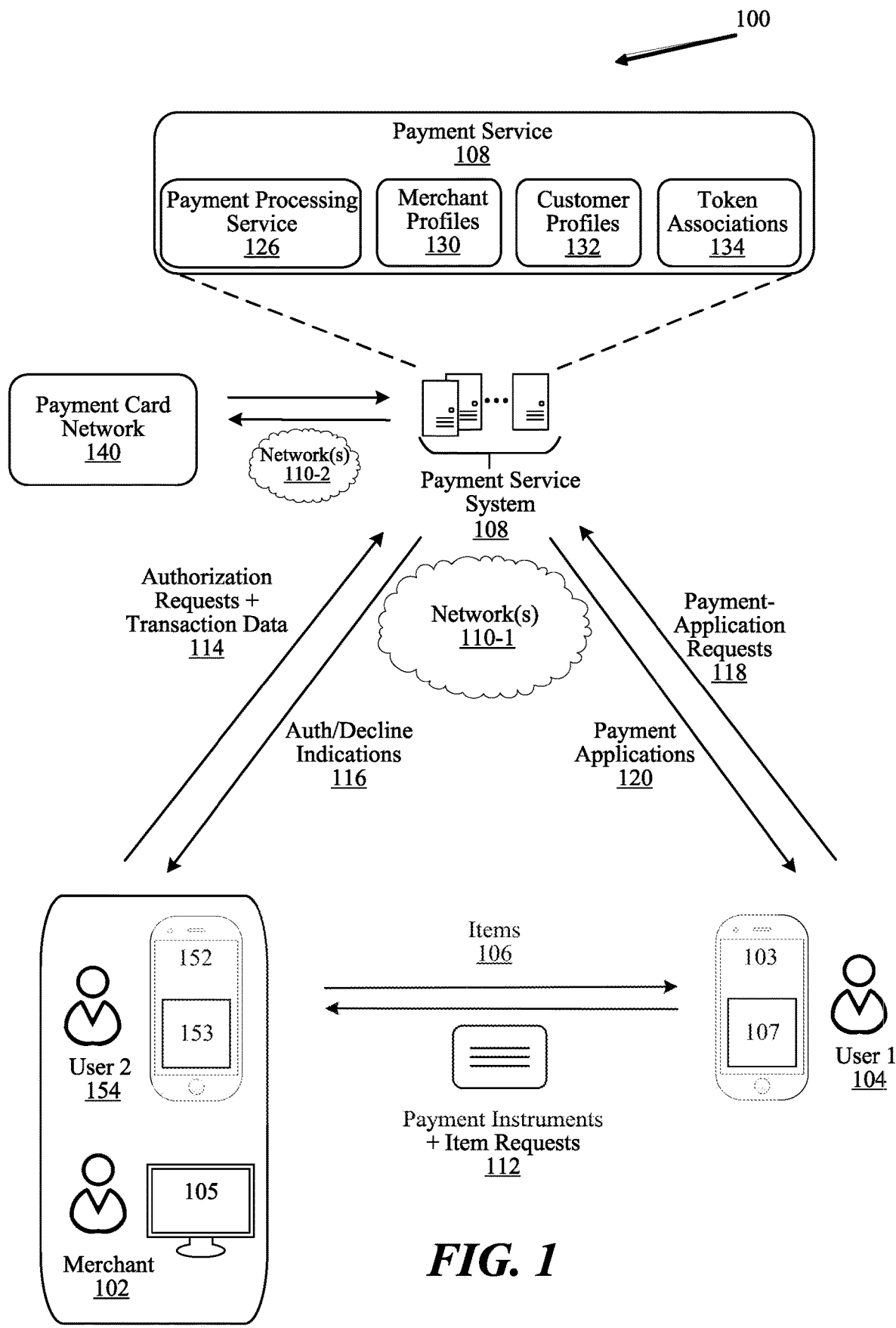
FIG. 1 illustrate an example payment service system network as described herein.

Particular embodiments described herein enable a user of an appropriate service to specify actions to be performed by a computing system or systems when interaction with a matrix barcode is detected. Particular embodiments described herein enable a user to register or claim a matrix barcode to be associated with their requested action. The matrix barcode may have been generated by a party other than the user prior to the user requesting that the matrix barcode be associated with their requested action. In particular embodiments, the requested action may involve manipulation of or interaction with an account associated with the user, for example a payment account. In particular embodiments, the requested action may involve manipulation of or interaction with an account of a user that interacts with the matrix barcode. In particular embodiments, the requested action may involve a third-party account (e.g., one associated with neither the claiming nor interacting user). As an example and not by way of limitation, a user may specify that interaction with a chosen matrix barcode facilitates transfer of a specified amount of money to the payment account of the user from an account of the interacting user.

In contrast to previous techniques associated with matrix barcodes, the actions specified by the user can be arbitrarily specified after the matrix barcode has been created and embodied in or affixed to digital media (e.g., an image shown on a mobile device screen) or physical media (e.g., a sticker or paper flyer). In some previous systems, a user would specify text for a matrix barcode, such as a URL to be launched when the matrix barcode is interacted with (e.g., scanned by an appropriately configured computing device). That text would then be used to generate the matrix barcode itself. In contrast, embodiments described herein enable a user to receive a pre-generated barcode and specify the actions to be performed when the barcode is interacted with. Particular embodiments described herein further enable a user to change the action associated with the matrix barcode after making an initial selection of an action. Thus, embodiments described herein enable a single matrix barcode (or a single matrix barcode design) to be repeatedly re-used by the same user for a variety of different purposes. As will be appreciated, dynamically- and user-specified actions to be performed after detection of interaction with a matrix barcode allow for more efficient allocation and use of matrix barcodes for a host of actions.

Particular embodiments disclosed herein enable the user to specify a range of actions to be associated with a pre-generated matrix barcode based on information relating to the context of interaction with the matrix barcode. A device or application that interacts with the matrix barcode may report information associated with the time or place of the interaction, the identity of a user associated with the device, information associated with the user of the device and stored by the device or one or more third-party systems, and any other information that may inform the context of interaction with the matrix barcode. As will be appreciated, in addition to the advantages of dynamically-specified actions, the use of contextual information associated with the interaction with a matrix barcodes provides for even greater functionality of systems employing matrix barcodes to facilitate services to, and between, users.

Particular embodiments described herein enable the use of techniques to verify the identity of devices interacting with a matrix barcode. A computing system may log such interactions and use the information to provide recommendations for interactions or updates to interactions. Prior to the initiation of an action subsequent to interacting with a matrix barcode, the computing system may also verify the identity of an individual associated with a device that has interacted with a matrix barcode. Identity verification may prevent unwanted actors from performing the associated action. Additional embodiments described herein provide for matrix barcodes that are encrypted or randomized to avoid including sensitive information in the plaintext of the matrix barcode. For example, the matrix barcode itself may include a randomized token that is associated with token associated with a user's account. Thus, a user may manage matrix barcodes associated as needed with a particular token and may manage many tokens associated with their account. A system relying on randomized tokens, as described herein, provides additional security benefits in that the barcodes and tokens are difficult to counterfeit, because only the centralized manager knows that a randomized string is associated with a matrix barcode and/or a claimed token. The centralized manager can control and deny access to actions accordingly.

Particular embodiments described herein describe variations on matrix barcodes and associated seeds. The seed or source from which a matrix barcode is generated may be configured to include information about the medium to which a matrix barcode is affixed. For example, a seed for a matrix barcode may include a so-called channel code that identifies the media. Thus a single token may be distributed with a number of varying channel codes corresponding to, for example, whether a matrix barcode was affixed to varieties of physical media or digital media. Channel codes may be used to identify advertising techniques or campaigns and can be used to track impressions generated by the campaigns, on a more granular level than a simple barcode association. Because the embodiments described herein support the association of pre-generated matrix barcodes to particular user accounts and account actions, the embodiments described herein facilitate the efficient mass production of physical media that uses the matrix barcodes. As described herein, this greatly improves the efficiency of systems employing these matrix barcodes.

Particular embodiments described herein relate to methods of improving the performance or rate of return from interactions with particular matrix barcodes. Systems employing the embodiments described herein may provide recommendations to users to improve the success of actions after a user has interacted with the matrix barcode based on information available to the system, but not necessarily any of the particular users. For example, one particular interaction with a matrix barcode may be to request that the interacting user transfer funds to the user who has claimed the matrix barcode and associated token. For example, a barista may have set up a matrix barcode as a digital tip jar. A payments service system may analyze, among other factors, a transaction history associated with the matrix barcode (for example, including transactions initiated based on interaction with the matrix barcode), a merchant at the same location of the matrix barcode, and the customers of the merchant (including those who do not interact with the matrix barcode) to determine a recommendation for improving the tips awarded to the barista. The payment service system may have access to a variety of transactional information related to the spending and money-transferring habits of the users of a payment service. For example, the payment service system may be able to compare transactions stemming from different barcodes for the purpose of determining effective additional messages or transaction amounts. The payment service system may identify trends in the available data that are relevant to the barista or to tipping in that location. The payment service system may provide recommendations based on commonalities between transaction amounts (or other action signifiers) associated with different tokens and corresponding matrix barcodes. The payment service system may provide recommendations responsive to particular performance indicators, such as amount of money transferred to the barista or number of transactions completed. These performance indicators may be specified by the user or may be applied on a system-wide level.

The payment service system described herein includes significant technical advantages and improvements over previous systems. As but one example of the technical advantages and improvements, the payment service system described herein enables distribution of functionality within a network to enhance the performance of matrix barcode-based systems and systems that interact with matrix barcodes generally. The system described herein allows for devices optimally situated to handle steps of the procedures described herein (based on, e.g., computing performance, available power usage, detected network availability) to perform those steps. As another example of the technical advantages and improvements, the present system enables enhanced security performance of matrix barcode-based systems and systems incorporating matrix barcodes because the matrix barcodes are linked to tokens stored in a centralized data structure maintained by the system to control access. Functionality of these systems is further improved because the centralized storage allows for the matrix barcodes to be reprogrammed, remapped, or reconfigured as needed for security or functionality reasons.

The embodiments disclosed herein are only examples, and the scope of this disclosure is not limited to them. Particular embodiments may include all, some, or none of the components, elements, features, functions, operations, or steps of the embodiments disclosed above. Embodiments disclosed in the attached claims directed to a method, a storage medium, a system and a computer program product, wherein any feature mentioned in one claim category, e.g., method, may be claimed in another claim category, e.g., system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject matter which may be claimed comprises not only the combination of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

FIG. 1 illustrates an example payment service system network environment 100. A user 104 or "customer 104" may conduct transactions with a merchant 102 for items 106 offered by the merchant 102. The user 104 may also conduct transactions with a second user 154, possibly for items 106 offered by the user 154. The user 104 may use a user device 103, the merchant 102 may use a point-of-sale (POS) device 105, and the user 154 may use a user device 152. FIG. 1A also illustrates a payment service system 108 (also referred to as "payment service"), coupled to the user devices 103 and 152 and merchant POS device 105 via a network 110-1, to authorize payment instruments of user 104. User 104 may engage in transactions with merchant 102 to obtain items 106. User 104 may provide, as shown at 112, payment instruments to merchant 102, including cash, credit, check, or other suitable payment instruments along with requests for items or services offered by merchant 102 or user 154.

Merchant 102 may utilize POS device 105 for accepting payment from customer 104. POS device 105 may comprise any sort of mobile or non-mobile devices that include instances of a merchant application that executes on the devices. The merchant application may provide POS functionality to POS device 105 to enable merchant 102 (e.g., owners, employees, etc.) to accept payments from customers 104. In some types of businesses, POS device 105 may correspond to a store or other place of business of the merchant, and thus, may be a fixed location that typically does not change on a day-to-day basis. In other types of businesses, however, the location of POS device 105 may change from time to time, such as in the case that a merchant operates a food truck, is a street vendor, is a cab driver, etc., or has an otherwise mobile business, e.g., in the case of a merchant who sells items at buyer's homes, places of business, and so forth.

User 154 may mobile device 152 for accepting payment from customer 104. Mobile device 152 may be executing an instance of an application 153 associated with the payment service 108. The instance of the payment application 153 may provide wallet or even POS functionality to the user device 152 to enable user 154 to accept payments from other users 104.

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items, e.g., item 106. Thus, a merchant and a customer may interact with each other to conduct a transaction in which the customer acquires item 106 from merchant 102, and in return, customer 104 provides payment 112 to merchant 102.

As used herein, a transaction may include a financial transaction for the acquisition of item(s) that is conducted between customer 104 and merchant 102. For example, when paying for a transaction, customer 104 may provide the amount that is due to the merchant using cash or other payment instrument 112 (e.g., a debit card, a credit card, a stored-value or gift card, a check, through an electronic payment application 107 on device 103 carried by the customer, or the like). The merchant may interact with POS device 105 to process the transactions, such as by inputting (e.g., manually, via a magnetic card reader, NFC reader, or an RFID reader, etc.) identifiers associated with payment instrument 112. For example, a payment instrument of the customer may include a card having one or more magnetic strips for providing card and customer information when swiped in a card reader. In other examples, other types of payment instruments may be used, such as smart cards having a built-in memory chip that is read by the device when the card is inserted into the reader, such as chips that comply with the EMV standard, i.e., EMV smartcards. In other examples, other types of payment instruments include cards or computing devices that communicate via radio frequencies such as a radio frequency identification tags, and near field communication devices, etc. As appropriate, transaction may also include the transfer of funds from a first user 104 to a second user 152 for items 106, services, or without a corresponding item at issue. For example, a user 104 may send a user 152 money as a gift through the instance of the payment application 107 executing on the mobile device 103 of the user 104.

During a transaction, POS device 105 (or mobile device 152 with an appropriate instance of the payment application 153) may determine transaction information describing the transaction, such as the identifier of the payment instrument, an amount of payment received from the user 104, the item(s) acquired by the user 104, a time, place and date of the transaction, a payment network 140 associated with the payment instrument, an issuing bank of the payment instrument, a name or user account of the user 104, contact information of the user 104, type of the currency, and so forth. POS device 105 (or mobile device 152) may send the transaction information to payment service system 108 over network 110-1, either substantially contemporaneously with the conducting of the transaction (in the case of online transactions) or later when POS device 105 (or mobile device 152) is in the online mode (as in the case of offline transactions).

In an offline transaction, POS device 105 or the payment application 153 may store one or more characteristics associated with the transaction (i.e., the transaction information), such as a cost of the transaction, a time of day at which the transaction occurred, a day of the week at which the transaction occurred, a location at which the transaction took place, an item that the user 104 obtained, identity and/or contact information of the user 104, and a payment instrument used in the transaction. After conducting an offline transaction with user 104, POS device 105 may provide the stored information (or some subset of it) to the payment service system 108 over the network 110-1. The network 110-1 may represent any one or more wired or wireless networks, such as a Wi-Fi network, a cellular network, or the like. In an online transaction, POS device 105 or mobile device 152 may send this information to payment service system 108 over network 110-1 substantially contemporaneously with the transaction with the user 104.

After merchant 102 or user 154 receives the payment information from customer 104, they may send respective authorization requests, along with information regarding the respective transactions, to payment service system 108, as illustrated at 114. Payment service system 108 may include payment processing service 126, merchant profiles 130, customer profiles 132, and other support information, such as a token association structure 134. Here, the merchant profiles 130 may comprise information about one or more merchants using the payment service system 108. The customer profiles 132 may comprise information about one or more customers using the payment service system 108. Each merchant or customer may otherwise be called a user of the payment service system 108. A particular user may be a merchant, a customer, or either depending on the use case. As described herein, the token associations structure 134 may store information associating matrix barcodes with tokens and requested actions.

The payment processing service 126 may receive the information regarding a transaction from POS device 105 of merchant 102 or the instance of the payment application 153 executing on the mobile device 152 and attempt to authorize the payment instrument used to conduct the transaction. Payment processing service 126 may then send an indication of whether the payment instrument has been approved or declined back to the requesting device, as illustrated at 116.

When a user and a merchant enter into an electronic payment transaction, the transaction may be processed by electronically transferring funds from a financial account associated with the user to a financial account associated with the merchant or other user. As such, the payment processing service 126 may communicate with one or more computing devices of a payment card network 140 (or "card payment network") over network(s) 110-2 to conduct financial transactions electronically. Payment processing service 126 may also communicate with one or more computing devices of one or more banks, processing/acquiring services, or the like over the network 110-2. For example, payment processing service 126 may communicate with an acquiring bank, and/or an issuing bank, and/or a bank maintaining customer accounts for electronic payments. Payment processing service 126 may also communicate with, or access customer and merchant accounts maintained by payment service system 108.

An acquiring bank may be a registered member of a card association and may be part of a card payment network 140. An issuing bank may issue credit cards to buyers and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In transactions involving cryptocurrency, payment service system 108 may communicate over network(s) with one or more cryptocurrency networks. Such networks may include for example, the Bitcoin network, the Ethereum network, etc. Cryptocurrency networks are associated with a network of parties that cryptographically verify and validate transactions and record transactions on copies of a distributed ledger commonly called the blockchain. Once a transaction has been validated, a cryptocurrency network may approve the transaction by writing the transaction to the blockchain. The time for such processes to complete may be impractically long for many applications.

Networks 110-1 and 110-2 may represent any one or more wired or wireless networks, such as a Wi-Fi network, a cellular network, a wide area network, a local area network, or the like. For the purposes of illustration, networks 110-1 and 110-2 are shown as separate networks. In particular embodiments, networks 110-1 and 110-2 may be the same network, subnets of the same network, one or more separate networks, or other suitable arrangement.

While FIG. 1 illustrates merchants 102 and users 154 sending the transaction data directly to the payment service system 108 as part of the request to authorize the payment instrument, in some instances other entities (e.g., banks associated with the merchants or with customer payment instruments) may provide transaction data, such as part of a batched, periodic process.

While customer profiles 132 may store indications of user preferences, merchant profiles 130 may store information associated with respective profiles of the merchants 102. For instance, the merchant profiles 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) or user 154 may determine when the customer visits physical premises or a digital presence of the merchant or is in the vicinity of the user 154. For instance, the device 103 of the customer 104 may include an application 107 (e.g., an application provided by payment service system 108) that communicates with POS device 105 of merchant 102 or mobile device of the user 154 via near-field communication methods (e.g., Bluetooth, etc.). Therefore, when the customer visits the physical premises of merchant 102, for example, POS device 105 may detect the presence of customer device 103. The POS device may accordingly determine that the customer is present. In another example, POS device 105, mobile device 152, and user device 103 may share locations (e.g., GPS coordinates) to a common service for determining when the devices are located within a threshold proximity of one another, and for mediating a transaction between customer device 103 and POS device 105 or mobile device 152.

In another example, customer 104 may utilize customer device 103 to "check in" at a merchant location, and POS device 105 may receive an indication of this check in. When the customer visits a digital presence of merchant 102 (e.g., a website, etc.), customer 104 may log in or otherwise provide information (e.g., a cookie on the device 103) from which the merchant determines that the customer is at the merchant. Of course, while a few examples are listed, it is to be appreciated that the merchant and/or payment service system 108 may determine when the customer is present at the merchant in any other number of ways. In each instance, after payment service system 108 receives an indication that customer 104 is located at merchant 102, the payment service system 108 may determine whether to send one or more previously expressed item preferences of the customer to the merchant.

In addition, customer 104 may desire to receive an instance of a payments application 107, such as a mobile wallet application, from the payment service system 108. FIG. 1 illustrates, at 118, that the customer 104 may send payment-application requests to payment service system 108. In response, at 120, payment service system 108 may provide instances of the application 107 back to customer device 103. In addition, payment service system 108 may map an identification of the instance of the application 107 to the customer profile.

In some embodiments, one or more of the applications 153 and 107 may be point-of-sale applications. In some embodiments, one or more of the applications 153 and 157 may be mobile wallet applications. In some embodiments, one or more of the applications 153 and 157 may be applications provided by a third party capable of accessing at least one payment account. The present technology contemplates that currency or assets may be sent from any party of any character (merchant, user, bank, etc.) to any other party of any character using the innovations described herein.

The payment service system 108, in coordination with the POS system 105, payment applications 153 and 107 allows, for a more expansive array of payment options, transactions that are completed more quickly and accurately by reducing the communication and processing times needed for computing systems of various parties to authorize and process the transactions and simplifies the interactions and interfaces that a user must engage with in order to prepare and request the transactions. Taken together, these improvements amount to an overall improvement over previous payment processing systems and related devices. The payment service system therefore includes significant technical advantages and improvements over previous devices. As but one example of the technical advantages and improvements, the present system enables distribution of functionality within a network to enhance the performance of matrix barcode-based systems and systems that interact with matrix barcodes generally. As another example, of the technical advantages and improvements, the present system enables enhanced security performance of matrix barcode-based systems and systems incorporating matrix barcodes because the matrix barcodes are linked to tokens stored in a centralized data structure maintained by the system to control access. Functionality of these systems is further improved because the centralized storage allows for the matrix barcodes to be reprogrammed, remapped, or reconfigured as needed for security or functionality reasons.

Figure 2:
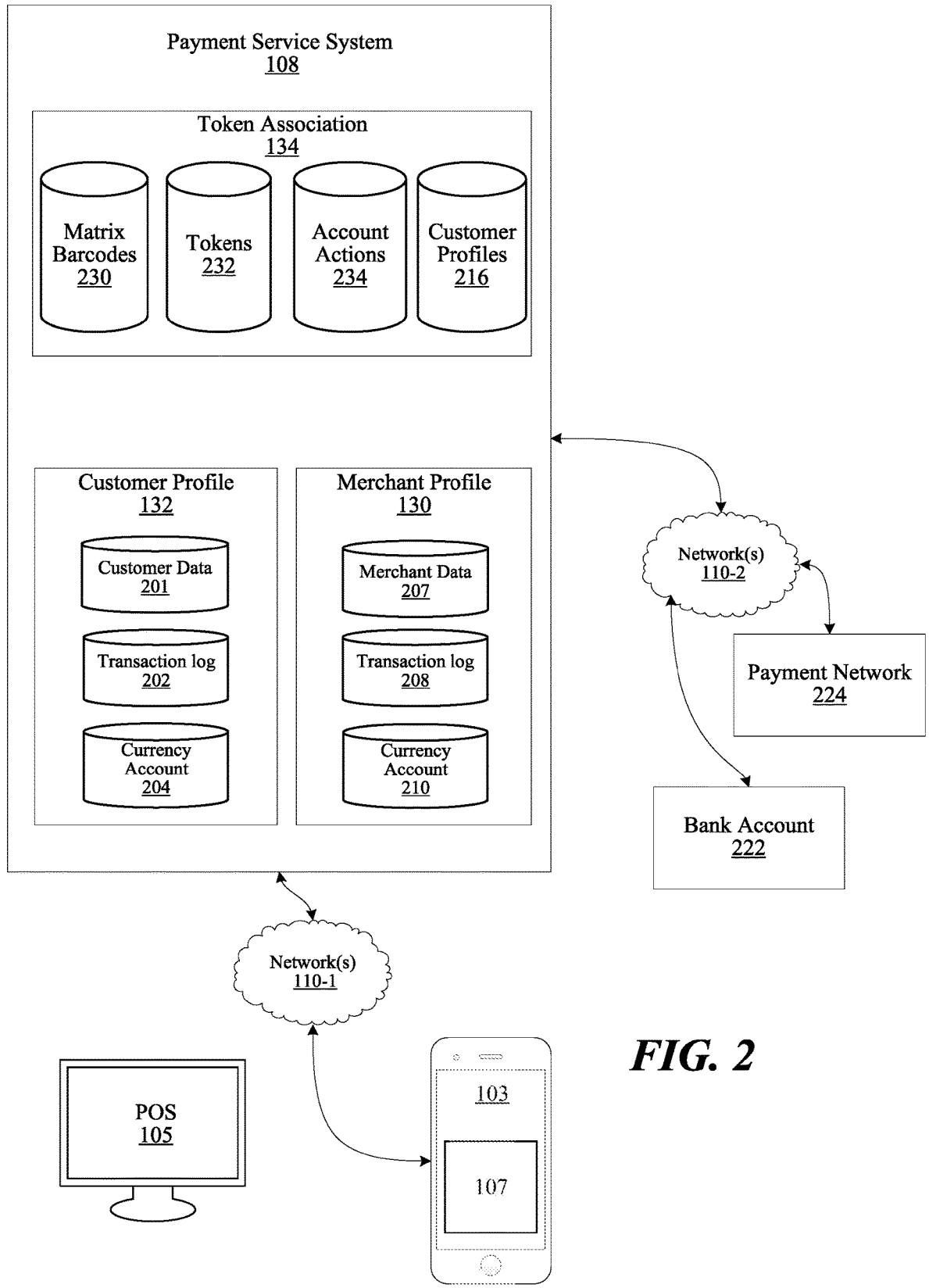
FIG. 2 illustrates an example system architecture for a payment service system as described herein.

FIG. 2 illustrates an example system architecture for a payment service system 108 embodying aspects of the inventions described herein. In particular embodiments, the payment service system 108 may store customer profile 132 for each of a plurality of customers. Customer profile 132 may include customer data 201 that may include customer-identifying information (name, contact information, demographical data, etc.), a transaction log 202 including records of past transactions involving payment service system 108 by customer 104, information regarding linked accounts (credit card information, bank account information, securities accounts, etc.), information regarding services utilized by customer profile 132 (e.g., an instance of a mobile wallet application). The customer data 201 may further comprise information associated with one or more social or peer-to-peer contacts of a user (e.g., friends, family members, online network connections). The information may comprise at least part of the profile information of such contacts.

The customer profile 132 may also include a record 204 for any accounts managed by payment service system 108 on behalf of customer 104. It will be appreciated that customers having accounts managed by the payment service system 108 is an aspect of the technology that enables technical advantages of increased processing speed and improved security. For example, the customer profile 132 may include a currency account 204. The currency account 204 may include information regarding one or more separate accounts of the user that each include currency owned by the customer. The currency account may include information regarding any valid payment method managed by the payment service system 132 on behalf of the customer, including, but not limited to, fiat currency, cryptocurrency, securities, etc. The currency accounts 204 may include a logical division of currency held by the payment service system 108 that is allocated for the customer's use.

An account may be funded by transferring currency in the form associated with the account from an external account (e.g., transferring a quantity of cash to payment service system 108), or by purchasing currency in the form associated with the account from the payment service system 108 using currency in a different form (e.g., buying a value of a security asset from payment service system 108 using a value of fiat currency), or by conducting a transaction with another user (customer or merchant) of the payment service system 108 wherein the account receives incoming currency. An account may be funded by purchasing security assets via the payment service system 108. When a customer requests to purchase security assets from the payment service system 108, the payment service system 108 may debit a balance stored in the currency account 204 of a certain type and credit a balance stored in a security account. The customer profile 132 may also comprise preference settings as to a preferred asset for payments (e.g., a preference to use a particular currency to pay for day-to-day transactions).

Similarly, as introduced with respect to FIG. 1 payment service system 108 may store merchant profiles 132. The merchant profiles 132 may comprise merchant data 207, transaction log 208, and currency account 210. The merchant data 207 may comprise one or more preference settings associated with the merchant 102, such as a type of currency or asset that the merchant prefer to receive as payment. The information stored in the merchant profile 132 may be made accessible and managed by a merchant 102 through a POS device 105 or other suitable devices associated with the merchant 102. Operations, including maintenance and management operations, described with respect to the customer profile 132 and information included therein (e.g., the customer data 201, transaction log 202, currency account 204) are as much applicable to the merchant profile 132 and the information included therein (e.g., the merchant data 207, transaction log 208, currency account 210).

When two users (e.g., users 150 and 154) engage in a transaction that involves a transfer of assets, such a transaction may be reflected in the accounts associated with each customer's profile 132. As an example and not by way of limitation, a first user 104 may transfer a quantity of currency (e.g., fiat currency, cryptocurrency, security assets, etc.) to a second user 154. The payment service system 108 may accordingly debit the currency account 204 of the first user 150 and credit the currency account 204 of the second user 154.

Additionally, customer 104 may also have one or more external payment cards registered with payment service system 108. The external payment cards may be associated with external bank accounts 222. The external payment card accounts may not be managed by payment service system 108. Instead, an appropriate external payment network 224 may process transactions conducted with payment cards.

Additionally, customer 104 may also have one or more internal payment cards registered with payment service system 108. Internal payment cards may be linked to all accounts associated with customer profile 132. In some embodiments, options with respect to internal payment cards may be adjusted and managed using a payment application 107 installed on the customer device 103. For example, when customer profile 132 includes multiple payment accounts (e.g., cryptocurrency and fiat currency), application 107 may set one of those accounts to be the default account for debits or credits when using an internal payment card.

Customer 104 may access and monitor customer profile 132 including payment cards registered with payment service system 108 and currency account 204 through the application 107 installed on the customer device 103. The application 107 may be a customer facing application provided by payment service system 108, or that is configured to access customer profile 132 through use of one or more APIs provided by payment service system 108. In some embodiments, application 107 on the customer device 103 may provide digital wallet functionality including storing payment methods and permitting electronic payments by customer device 103 at the instruction of application 107.

In particular embodiments, the payment service system 108 may maintain a token association data structure 134. The payment service system 108 may use said structure 134 to provide a matrix barcode association service as described herein. The token association structure 134 may require generation and storage of a plurality of matrix barcodes 230 and corresponding tokens 232. Tokens may be uniquely-assigned random or pseudo-random character strings generated by the payment service system 108. Matrix barcodes may be generated based on the tokens (e.g., from a matrix barcode-generation algorithm). To identify a corresponding token, all that will be required is to decode (and possibly decrypt) the matrix barcode. Matrix barcodes may be generated from another set of uniquely-assigned random or pseudo-random character strings. The matrix barcodes (and corresponding strings) may be stored in association with a corresponding token. Thus, the matrix barcode database 230 and token 232 database may be linked as jointly maintained databases. To identify the token corresponding to a matrix barcode, the matrix barcode must first be decoded, then the payment service system 108 must determine the token corresponding to the decoded matrix barcode string. It will be appreciated that stored corresponding tokens within the control of the payment service system, rather than making them purely executable or plaintext storage enhances the security and flexibility of previous technologies. The payment service system may provide users the option to re-map existing matrix barcodes between different claimed tokens, and especially to associated dynamically-assigned actions to claimed tokens.

Token database 232 may store links to customer profiles 132 and/or customer accounts that are associated with a claimed token. A token may be considered claimed when it associated with an account or an account action. An unclaimed token may be available to be claimed by a user with a valid account who interacts with the claimed token. As described herein, interacting with a token may include interacting with a matrix barcode that corresponds to the token.

Token association data structure 134 may also include storage of account actions 234 to be performed after interaction with a matrix barcode and corresponding token. Account actions may include specification of particular actions for the payment service system 108 to take upon detection of interaction with the associated token. Account actions may involve one or more customer profiles 132 or accounts. For example, an account action may involve only the account of the user that interacted with the token. Such account actions may include the creation of an association between the account of the interacting user and the token. An account action may include only the account of the user to whom the token is claimed. Such account actions may include sending a notification to the user or logging the interaction. Account interactions may include the account of the user to whom the token is claimed and the account of the interacting user. Such account actions may include the transfer of funds between one or more of the accounts (or the request for confirmation for such a transfer). An account action may involve a third-party account (e.g., neither the account of the interacting user nor the account to which the token is claimed).

Token association data structure 134 may also include storage of customer profiles 216 affiliated with a matrix barcode and corresponding token. The customer profiles database 216 may be updated with the customer profile or an identifier for a customer profile that has claimed a particular token (e.g., that has an updated record in the token database 232) and matrix barcode (e.g., that has an updated record in the matrix barcode database 230). In addition to claiming a token, an affiliated customer profiles may also be a customer profile that is the beneficiary or target of an account action that is not the customer profile that claimed the matrix barcode and claimable token. The customer profile database 216 of the token association data structure 134 may be linked to the customer profiles 132. The token association data structure 134 therefore provides and records links between the stored matrix barcodes 230, claimable and claimed tokens 232, associated account actions 234, and customer profiles 216.

Although this disclosure describes the token association and matrix barcode matching service being maintained operated by the payment service system 108, this disclosure contemplates that matrix barcode and token association may be operated by a separate system associated with the payment service system 108 controlled by the provider of the payment service or by a third-party. Combining the matrix barcode association service with the payment service may increase speed and reliability of access to the associated account actions. Maintaining the matrix barcode association service as a separate service from the payment service (e.g., accessible via one or more APIs) may provide for greater security to the payment service system.

Matrix barcodes may be generated using a variety of proprietary or publicly-available methods. One common approach is the Quick-Response or QR code which has been governed by a number of international standardized systems since it was first devised. Generally speaking, generating a matrix barcode includes taking in a seed as an input, validating the input, and converting it into a two-dimensional matrix barcode such that the output is uniquely matched to the input and vice versa. Thus, a system that is capable of interpreting the matrix barcode can reliably reconstruct the input from the matrix barcode. The input may be in a variety of suitable data formats, but common approaches include a plaintext string, a URL, a contact information card, login information, payment account information, a geographic location, calendar events, and other similar static information. The range of inputs tends to be restricted by the drive to universal adoption of a set of standards governing the use of matrix barcodes. Once a matrix barcode has been generated, it cannot be modified, for example, to update the information associated with that matrix barcode. Instead, a brand new matrix barcode must be generated.

To interpret the matrix barcode, it is imaged by a digital image sensor and analyzed by a computer processor. The matrix barcode is analyzed to determine the correct orientation of the matrix barcode. The image is normalized (e.g., for size, angle of viewing) and the elements of the matrix barcode are converted to binary code and validated using error-correction methods. From the binary numbers the input is determined. Depending on the application of the matrix barcode, some action may be taken. For example, the text string may be displayed, a phone call initiated based on a contact card, or a URL may be launched in a web browser. If the input was specially coded to work with a particular application, the application may be launched in response to the execution of the inputs (e.g., through deeplinking). In some cases, the input may have been subject to additional encryption or encoding methods. The application interpreting the matrix barcode often is responsible for determining the encryption mechanism and decrypting the input or passing the binary code to another application that is capable of doing so.

In particular embodiments, when generated, each matrix barcode may be associated with a token uniquely identifying the matrix barcode. For example, the token may first be generated, with the matrix barcode generated based on the token (e.g., the token is the seed input). As another example, the matrix barcode may be generated from a randomized value (e.g., a random string or number) and an existing token may be associated with the barcode (e.g., the image) or the randomized value associated with the barcode (e.g., so that a system could re-generated the matrix barcode on-demand). The token and the matrix barcode may be stored in association in a database of a matrix barcode-identification system. Thus, to determine the token associated with a matrix barcode (or vice versa), the database may be queried with the matrix barcode. The token associated with the matrix barcode may be provided as the corresponding token.

The token corresponding to a matrix barcode may be used for a wide variety of purposes. The token may be associated with essentially arbitrary secondary information or commands that can be assigned at a later date. Because the token can be "re-programmed" or associated with a new command at a time after the creation of the matrix barcode, the barcodes may be referred to as "dynamic matrix barcodes" to differentiate from previous "static" matrix barcodes. For example, the token may be associated with contact information, a URL, payment account information, a text string, a workflow or sequence of commands, etc. Importantly, while the value of the token may change, the secondary information may be modified without affecting the value of the token or the appearance of the matrix barcode. Thus, a single matrix barcode may be used repeatedly for any number of uses without needing to be rewritten. As a simple example, a student could affix a matrix barcode to a business card and associate with the token with a command to provide a URL to the student's social media page. When the student begins interviewing for jobs, the student may update the command to provide a URL to download the student's resume. Later, the student may update the command to provide a URL to the webpage on their new employer's website. All of this may be done without the student needing to reprint business cards at each step of the way.

These principles may be used in a variety of industries. An advertising company may use a single matrix barcode for a company and update the associated command based on the advertising campaign run for the company. A teacher may use a single matrix barcode for a class and update the command to provide a link to the latest reading assignment. A payment service may provide matrix barcodes for use by customers who may associate the barcodes with methods of requesting or sending payment. For example, a store may use a different matrix barcode for each space on a shelf and update the information provided (e.g., information on the item or a link to pay for the item) by a person scanning the matrix barcode. While it is common to see traditional barcodes affixed to each item in a store, this is costly and requires orders of magnitude more barcodes to be generated than if only the store shelf were labeled. Although this disclosure describes embodiments relating to a payment service, the same techniques would be understood to be applicable to other industries that may benefit from the use of dynamic actions performed from interaction with a matrix barcode.

Because dynamic matrix barcodes may be re-associated with commands after they have been generated, the matrix barcodes may be more easily used in scenarios where they are affixed to physical media. For example, a charity may desire to present information and solicit donations through flyers. The charity may configure a matrix barcode to, for example, include a URL linking to a webpage for a particular campaign. The matrix barcode may be easily printed on paper flyers for distribution. When the campaign has ended, the matrix barcode, and all associated media, must be discarded in favor of a new matrix barcode used for a new campaign. However, suppose that the charity wishes to use more expensive physical media (e.g., shirts, hats, mugs, etc.). It would be prohibitively expensive to include a single-use matrix barcode on more expensive physical media.

According to particular embodiments, dynamic matrix barcodes may provide a solution. The charity may request a barcode-identifying service (or, e.g., a payment service supporting a barcode-identifying service) to generate a matrix barcode and corresponding token. The charity may use that matrix barcode on a wide variety of physical media. For each fund-raising or awareness campaign, the charity may re-program the dynamic matrix barcode (e.g., re-associate the token with a new command) to provide any updated information or donation opportunities. Thus, the same physical media could be re-used without waste. As described herein, interactions with the matrix barcode may be associated with contextual data, allowing the usage of the matrix barcode to be even further fine-tuned. For example, a charity may associate matrix barcode interactions at a specified location (e.g., within a particular city) to launch a first webpage, while interactions at a second location (e.g., within a different city) to launch a second webpage. Furthermore, the charity may use different channel codes embedded in the matrix barcode to detect the effectiveness of different advertising materials. The barcode-identifying service may report the interaction channel that led to the interaction to the charity.

A payment service may provide a method of receiving payments by matrix barcode to its users. In one example, a user may request a static matrix barcode be generated to facilitate payment. The user may request that the static matrix barcode be affixed to physical media, such as stickers, that the user can distribute to attach to other items as desired. However, due to manufacturing, processing, and shipping times, the delay between the user requesting the static matrix barcode and actually receiving it may be undesirable. According to particular embodiments, the payment service may instead provide dynamic matrix barcodes. The payment service may generate many tokens and corresponding matrix barcodes and affix them to stickers to be prepared to be distributed on notice from users. The payment service may maintain a warehouse of stickers (and other physical media) to be distributed on-demand. The payment service may even provide for the stickers to be sold in retail stores. To use such a dynamic matrix barcode, a user may need to be registered with the payment service. The user may then register the dynamic matrix barcode to their account by requesting that the corresponding token be associated with their account. The payment service may also allow a user to designate an action to be taken with respect to their account when a second user interacts with the matrix barcode. As an example only, the user may designate that when a second user scans the matrix barcode, they are provided the opportunity to transfer a specified amount of money to the user.

Figure 3:
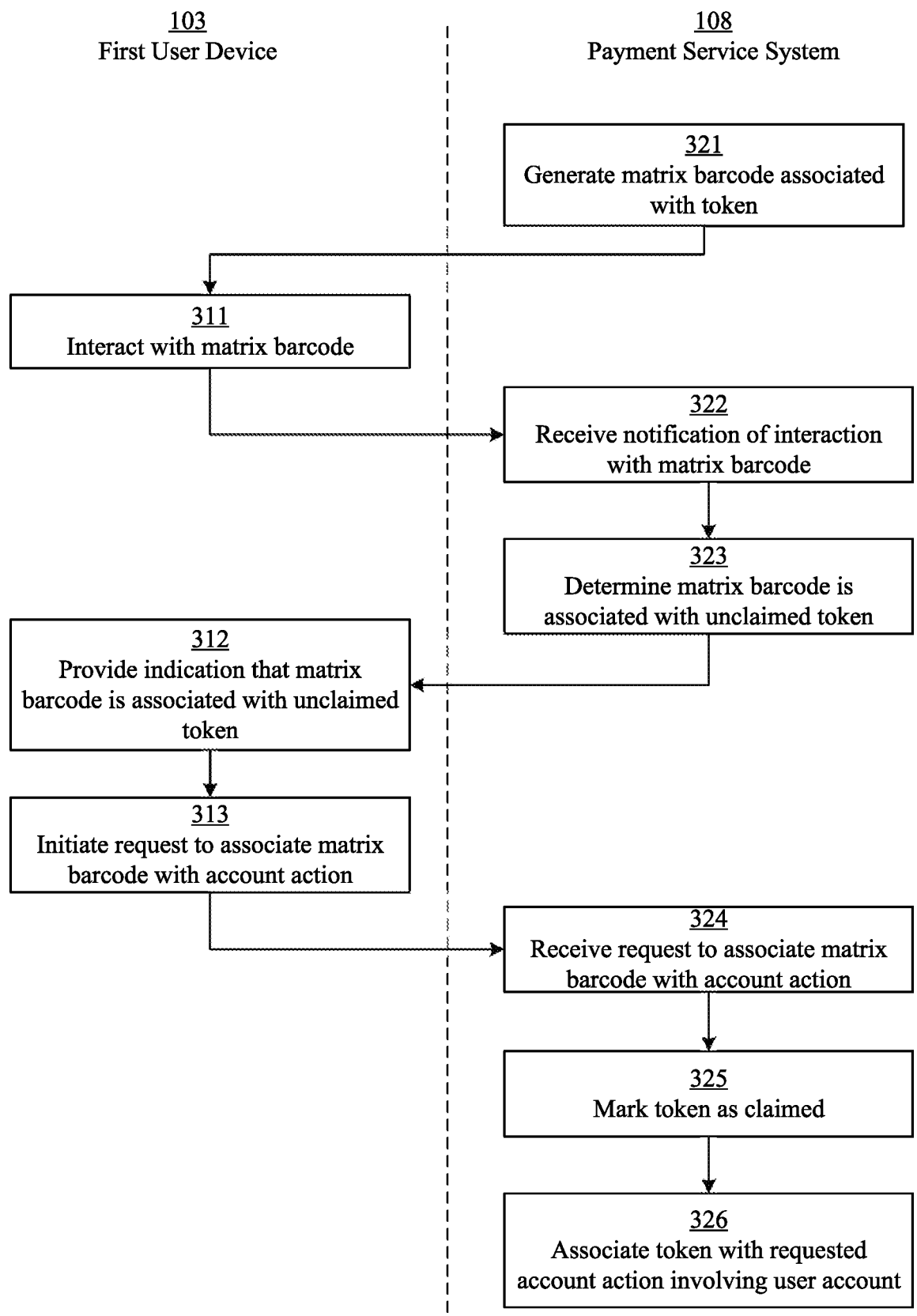
FIG. 3 illustrates an example method for associating a pre-generated matrix barcode with a specified account action.

FIG. 3 illustrates interactions between devices for an example process involving generating and registering a matrix barcode and corresponding token to a particular action. At step 321, a payment service system 108 (e.g., payment service system 108) or one or more components of a payment service system 108 working in coordination, may generate a claimable token and associated matrix barcode using, for example, any of the previously-described methods. The payment service system 321 may provide the matrix barcode for use in a digital format (e.g., to be displayed by a computing device display) or in physical format (e.g., affixed to one or more physical objects).

At step 311, a first user device 103 may interact with the matrix barcode. In particular embodiments, the first user device 103 may interact with the matrix barcode through a variety of appropriate mechanisms. As an example only, a camera sensor of the first user device may image a visual representation of the matrix barcode. The camera sensor may create a digital image file or may simply process the matrix barcode as incoming image data. In particular embodiments, the camera sensor may process the matrix barcode through a specialized application for processing matrix barcodes, through a general camera application capable of processing matrix barcodes, or through an application associated with the payment service system or other matrix barcode provider. As another example, the first user device 103 may receive an image file including the matrix barcode from another computing system through a communication channel. For example, the first user device 103 may receive the matrix barcode or any image of the matrix barcode through an email, short message, media message, through an application programming interface (API) call, from an application executing on the first user device 103, or any other suitable communication protocol. After the first user device 103 interacts with the matrix barcode, the first user 103 may send a notification to the payment service system 108 indicating that the first user device 103 has interacted with the matrix barcode. The notification may be sent by any suitable method, including but not limited to, a short message, email, API call from third-party application or application associated with payment service system, etc. In particular embodiments, the notification may include the matrix barcode or the token associated with the matrix barcode, in which case the first user device 103 may interpret the matrix barcode to identify the claimed token prior to sending the notification.

At step 322, the payment service system 108 may receive the notification that the first user device 103 has interacted with the matrix barcode. The notification may be received by a communication subsystem of the payment service system through an appropriate method corresponding to the method by which the notification had been sent by the first user device 103. If the notification indicated only the matrix barcode, the payment service system 108 may identify the token associated with the matrix barcode. In particular embodiments, the payment service system, or an appropriate subsystem thereof, may directly interpret the received matrix barcode to identify the claimed token. In particular embodiments, the payment service system 108 may use the matrix barcode as a reference to otherwise search for the associated claimed token. For example, when generating the matrix barcode, the payment service system 108 may have performed a two-layer abstraction where a first token is generated and stored by the payment service system 108. A second token may be generated and used to generate the matrix barcode. The second token, or an identifier therefor, may be stored in in associated with the first token so that the payment service system could identify the first token based on the identifier for the second token. In this way, the second token may be made available to the public without exposing additional details for how the token is used by the payment service system.

At step 323, the payment service system 108 may determine that the matrix barcode is associated with an unclaimed token. For example, the payment service system 108 may maintain a data structure storing all generated tokens in association with one or more accounts of users of the payment service system. A token may be considered "claimed" when the token is matched to an account. A token may be considered "unclaimed" when the token is not matched to an account or is not included in the data structure. In particular embodiments, the payment service system 108 may search the data structure using the token associated with the matrix barcode for which the payment service system has received a notification of interaction. Finding no corresponding account the payment service system may determine that the matrix barcode (and corresponding token) is not claimed. The payment service system 108 may send a notification to the first user device 103 indicating that the matrix barcode is unclaimed and providing the first user device 103 with the opportunity to claim the token associated with the matrix barcode.

At step 312, the first user device 103 may provide an indication to the user of the device that the matrix barcode and corresponding token are unclaimed. The first user device 103 may receive the notification from the payment service system 108 indicating that the matrix barcode and corresponding token are not currently claimed. The first user device 103 may display, for example, a pop-up or push notification in a user interface signifying that the matrix barcode has not been claimed. The first user device 103 may provide the indication through an application associated with the payment service executing on the phone. For example, upon receiving the notification, the first user device 103 may cause the application associated with the payment service to begin executing, or if it was previously operating in the background, may foreground the application. As another example, upon receiving the notification, the payment application may simply present a notification to the user without overriding the executing of other applications on the device. The notification may provide a user of the device to request the initiation of a process to claim the matrix barcode to their account.

At step 3613, the first user device 103 may initiate a request to associate the matrix barcode with an account of the first user. As described previously, the first user device 103 may cause an application associated with the payment service system 108 to begin executing on the first user device 103. The application may provide a user interface through which a user may identify, for example, an account the user has with the payment service and one or more actions to be executed when a user having a different account interacts with the matrix barcode. Actions to be executed when a user with a different account interacts with the matrix barcode may include any suitable action involving one or more accounts of users of the payment system, including, but not limited to, the transfer of funds from a first account to a second account, the creation of an association between two accounts, notification of one or more of the accounts, presentation of information associated with one of the accounts, and many other suitable types of actions. The user may further specify an action to be executed when the user interacts with the matrix barcode again. The first user device 103 may send the request to the payment service system 108.

At step 324, the payment service system 108 may receive the request to associate the matrix barcode and corresponding token with the user account and account action. At step 325, the payment service system 108 may mark the token associated with the matrix barcode as claimed. In particular embodiments, the payment service system 108 may add the token to the data structure storing associations with user accounts. In particular embodiments, the payment service system 108 may update the data structure record for the token to identify the user account. At step 326, the payment service system 108 may further associate the token with the account actions or actions indicated with the request received from the first user device 103.

Figure 4A:
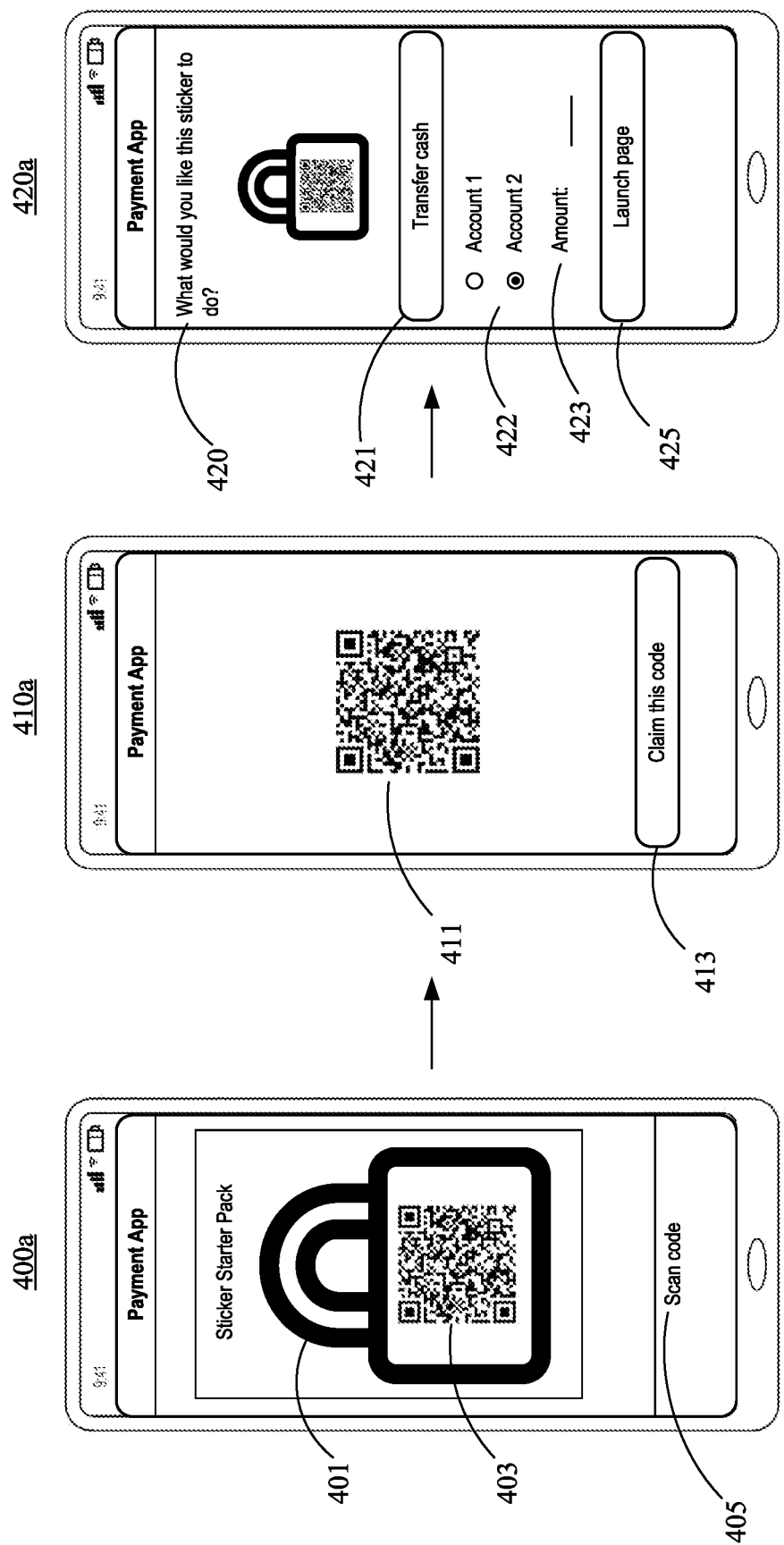

FIG. 4A illustrates several views of an example user interface of a device relating to the registration of a pre-generated matrix barcode to a user account. In interface 400a, a payment application associated with a payment service is operating on a mobile device of a user. The payment application provides a camera application allowing a user to, e.g., scan matrix barcodes and display the scanned barcodes in the user interface. The interface 400a provides instructions to the user to "Scan code" in element 405. While using the payment application, the user has caused a matrix barcode 403 to be captured by the camera of the payment application. In this example, the matrix barcode 403 is affixed to a "Sticker Starter Pack" provided by the payment service. In this case, the pack includes a number of stickers, including sticker 401 that all include the same matrix barcode 403 or, if they include different matrix barcodes 403, the matrix barcodes 403 are associated with the same token generated by the payment service and associated with the matrix barcode or barcodes.

After the payment application has scanned the matrix barcode 403, the payment application may query the associated payment system to determine whether or not the token associated with the matrix barcode 403 is claimed. The payment service system may query a barcode-identifying database associated with the payment system to determine if the token is claimed (e.g., if the token is associated with an account or account action). In the example illustrated in FIG. 4A, the payment service system may determine that the token is not claimed and inform the payment application. The payment application may transition to interface 410a. Interface 410a includes a detailed view 411 of the barcode 403. The detailed view 411 of the barcode 403 may be retrieved from a barcode-identifying database of the payment system associated with the payment application prior to display on the screen 410a. The detailed view 411 of the barcode 403 may be generated by the payment application once the payment application has identified the token associated with the barcode 403. Screen 410a further includes an interactive element 413 through which the user may initiate a request to claim the barcode or the token associated with the barcode. In particular embodiments, when the user interacts with the element 413, the payment application may send a preliminary request to the payment service system to notify the system that the user will be claiming the matrix barcode 403. The payment application may do so to prevent another user from claiming the token associated with the matrix barcode 403 at the same time.

After the user selects the interactive element 413 to claim the matrix barcode 403 and associated token, the payment application may transition to interface 420a. Interface 420a provides the user to identify which account actions should be taken when another user interacts with the matrix barcode 403 at a later time. Instructions 420 have been provided to guide the user. As illustrated, interface 420a includes several interactive elements 421 and 425 delineating possible actions. For example, interactive element 421 indicates that the action will be to transfer cash from the account of the other user to an account of the user. Elements 422 and 423 prompts the user to identify which of their accounts they would like to designate as the intended recipient. Element 423 provides the user the opportunity to specify an amount of cash to transfer. This may be used, for example, to specify a tip to be sent to the user. For example, the user is a musician who regularly performs at different coffee shops. The musician may accept cash tips from patrons of the coffee shop. However, the musician may have noticed that fewer and fewer people carry cash and are thus unable to tip. The musician may use the sticker 401 as a way to facilitate easy transfer of cash from the scanning user to the musician. Interactive element 425 indicates that the action will be to instruct a device of the other user to launch a webpage specified by the user. This may be used, for example, by the musician to quickly link the scanning user to their social media profile or to a website set up by the musician to advertise their music. After the user selects one of the interactive elements 421 or 425, the payment application may send a request to the payment service system to request that the select action be associated with the token corresponding to the barcode 403. The payment service system may update its records of the tokens and barcodes to indicate that the token is claimed to the account of the user and to indicate that when another user interacts with the barcode the selected action should be performed.

Figure 4B:
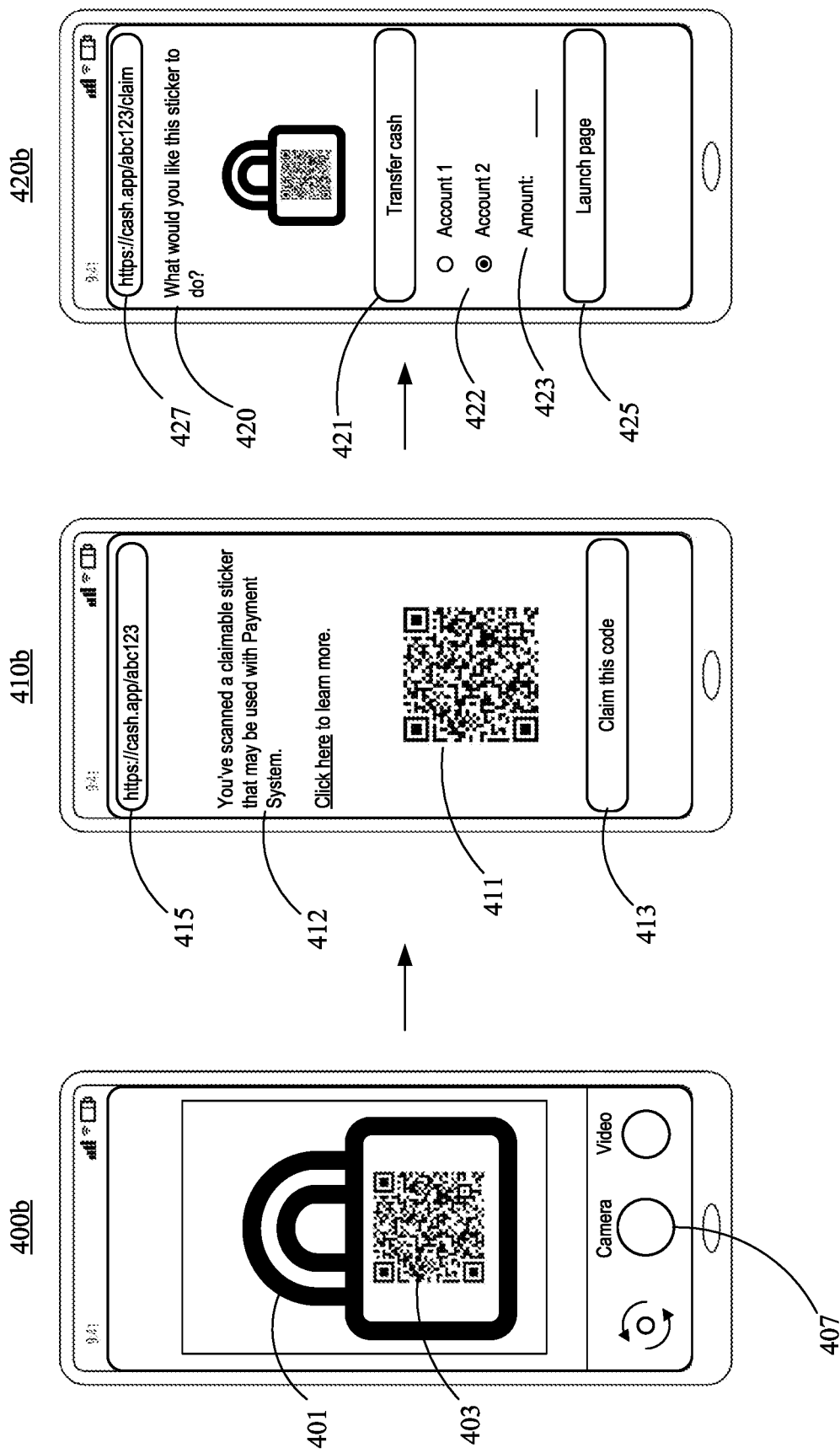

FIG. 4B illustrates several views of an example user interface relating to the registration of a pre-generated matrix barcode to a user account. In interface 400b, a third-party application is executing on a mobile device of a user. The third-party application includes a simulated view finder showing what is currently being imaged by a camera sensor of the mobile device. As shown in the interface 400b, the user has caused the matrix barcode 403, embodied again a sticker 401 to be captured by the camera sensor. Interface 400b also includes an interactive element 407 that, when selected, causes the camera sensor to save the image shown in the view to the mobile device.

In the example shown in FIG. 4B, the mobile device of the user does not have a version of the payment application supporting the claiming of matrix barcodes. In this example, the matrix barcode may include a URL that can be executed by a web browser of the computing device. When the third-party application scans the matrix barcode, the mobile computing device may prompt the user to launch a web browser to execute the URL. The URL may be uniquely matched to the matrix barcode or corresponding token so that when the web browser executes the URL, the payment service system may be notified. The payment service system may determine whether or not the token associated with the matrix barcode 403 is claimed, as described herein. Interface 410b shows the web browser, having executed the URL 415 when the payment service system has determined that the token corresponding to the matrix barcode 403 is unclaimed. Interface 410b includes a detailed view of the matrix barcode 411. Because a user without a compatible version of the payment application may not be familiar with the notion of claimable matrix barcodes for dynamic actions, interface 410b includes text 412 explaining the situation to the user. Interface 410b also includes an interactive element 413 that, when selected, will allow the user to claim the matrix barcode and corresponding token to their account directly through the web browser. After the user interacts with the interactive element 413, the user may be prompted to sign in to the payment service or create an account so that the system can identify the user.

After the user signs in or creates an account, the web browser may transition to show interface 420b. Interface 420b may include another webpage 427 accessible only to the user that has claimed, or is claiming, the matrix barcode 403. Like interface 420a, interface 420b includes instructions 420 guiding the user, and interactive elements 421 and 425 delineating actions that a user may request be performed when another user interacts with the matrix barcode 403 at a later time. Interactions with the elements of interface 420b may be handled in a similar manner to those shown in 420a, with the difference being that the payment service system is notified of the actions through the web browser, which may be provided by a third-party, and not through an application associated with the payment service system.

FIG. 4C illustrates several views of an example user interface relating to the registration of a pre-generated matrix barcode to a user account. As with interface 400*b*, interface 400*c* shows a third-party application executing a mobile device of a user. The third-party application includes a simulated view finder showing what is being captured by a camera sensor of the mobile device. As shown in the interface 400*b*, the user has caused the matrix barcode 403, embodied again a sticker 401 to be captured by the camera sensor. Interface 400*b* also includes an interactive element 407 that, when selected, causes the camera sensor to save the image shown in the view to the mobile device.

In the example shown in FIG. 4C, the mobile device of the user does not have a version of the payment application supporting the claiming of matrix barcodes. In this example, the matrix barcode may include a URL that can be executed by a web browser of the computing device. When the third-party application scans the matrix barcode, the mobile computing device may prompt the user to launch a web browser to execute the URL. The URL may be uniquely matched to the matrix barcode or corresponding token so that when the web browser executes the URL, the payment service system may be notified. The payment service system may determine whether or not the token associated with the matrix barcode 403 is claimed, as described herein. Interface 410*c* shows the web browser, having executed the URL 415 when the payment service system has determined that the token corresponding to the matrix barcode 403 is unclaimed. Because a user without a compatible version of the payment application may not be familiar with the notion of claimable matrix barcodes for dynamic actions, interface 410*b* includes text 412 explaining the situation to the user. Interface 410*c* includes an image 416 of the sticker 401 that the user scanned to cause the URL 415 to be executed. The sticker may be identified, for example, by a channel code included in the matrix barcode so that the token and individual sticker may be identified. As described herein, the channel code may be unique to the token or may be shared to indicate, for example, the type of media on which the token was embodied prior to the matrix barcode being interacted with. When the matrix barcode and corresponding token are saved by the payment service system, the payment service system may also note the channel codes and associated media in which the matrix barcode have been embodied. In the example shown in FIG. 4C, for security purposes the payment service system may not support claiming matrix barcodes and corresponding tokens, or designating actions therefor, from a web browser alone. Interface 410*c* may include text 417 prompting the user to claim the sticker by using an application associated with the payment service and may provide an interactive element 419 that, when interacted with, will cause the mobile device of the user to download (or otherwise acquire) the application.

Figure 5:
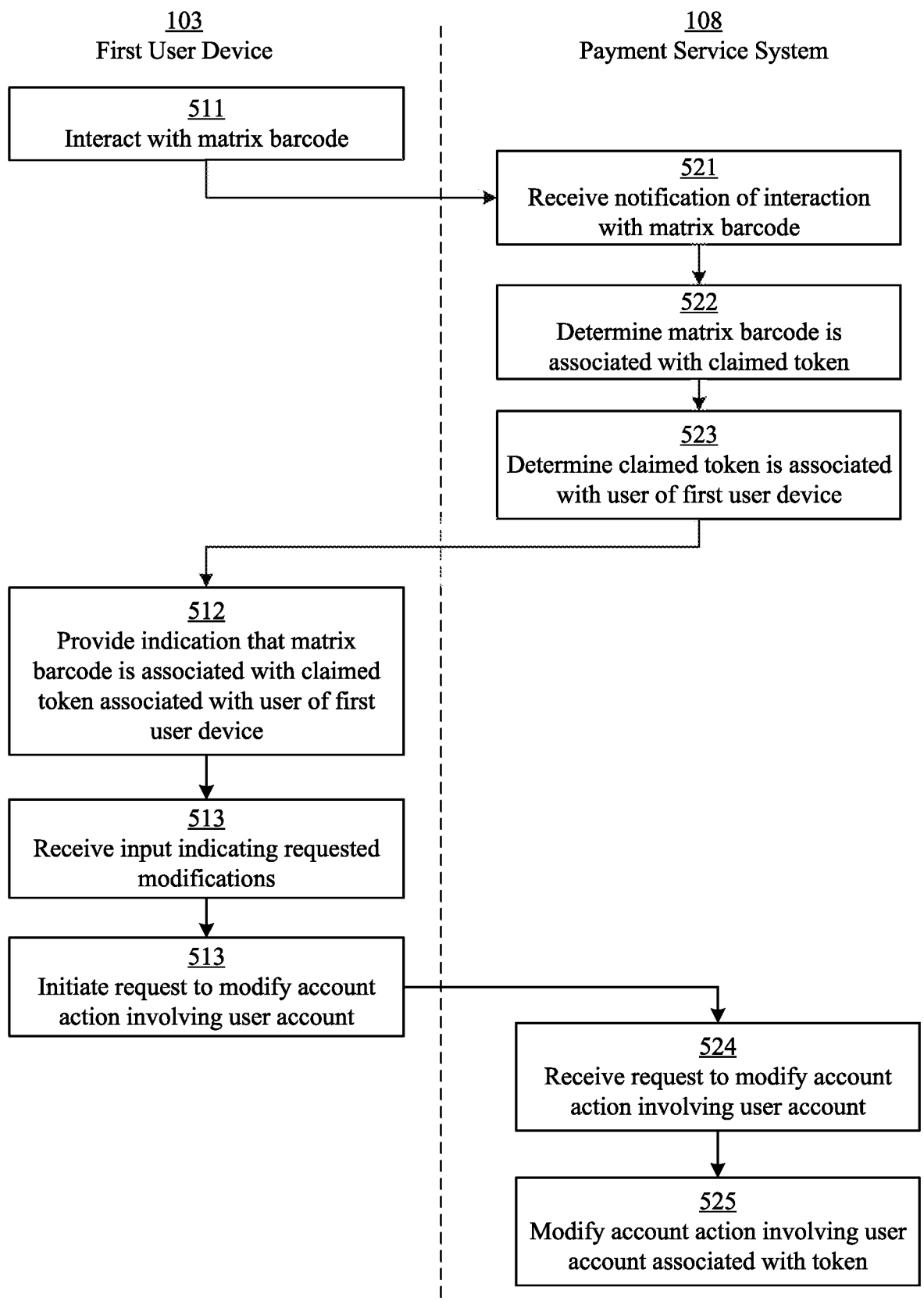
FIG. 5 illustrates an example method for modifying an account action associated with a pre-generated matrix barcode.

In particular embodiments, a user may desire to modify the action associated with a matrix barcode and corresponding token after the user has claimed the matrix barcode and corresponding token to be associated with their account. For example, a user may want to modify the financial account to which funds will be transfer or may wish to modify the amount of funds to be suggested as the transfer amount. As another example, a user may want to modify the address of the webpage that is launched when another user scans the matrix barcode. FIG. 5 illustrates interactions between devices for an example process involving modifying the account action associated with a matrix barcode and corresponding token. At step 511, a first user device 103 may interact with a matrix barcode. As described previously, the interaction may occur through a third-party application (e.g., a barcode scanner) or may occur through an application associated with a payment service. The application may send notification of the interaction to the payment service system. In particular embodiments, first user device 103 may interpret the matrix barcode and act accordingly. For example, a third-party application may interpret the matrix barcode to include a URL and may execute said URL in a web browser. Executing the URL may cause notification of an interaction to be sent to the payment service system. As another example, the application associated with the payment service executing on the first user device may interpret the matrix barcode to determine the token associated with the matrix barcode and send the token to the payment service system. The notification may include an identification of a user account associated with the first user device 103 or with the interaction (e.g., if a user is signed onto a friend's mobile device).

At step 521, the payment service system may receive the notification of interaction with the matrix barcode by any suitable method corresponding to the method by which the notification had been sent. At step 522, the payment service system may determine that the matrix barcode is associated with a claimed token. In particular embodiments, the payment service system may query a data structure storing association of matrix barcodes and corresponding tokens with accounts of users of the payment service and related actions. To determine that the token corresponding to the matrix barcode has been claimed, the payment service system may query the data structure with the token (either received from the first user device 103 or interpreted from the matrix barcode) and determine that an associated with a user account already exists. At step 523, the payment service system may compare the user account associated with the matrix barcode and corresponding token to the user account received in the notification from the first user device. If the accounts match, then the payment service system 108 may determine that the user interacting with the matrix barcode is the owner of the corresponding token. In particular embodiments, rather than receive the user account through the first notification, the payment service system 108 may send a separate request to the first user device 103 requesting the device to identify the user. In response the first user device 103 may identify the user or provide the user an opportunity to authenticate their account. The payment service system 108 may send a notification to the first user device 103 indicating the user of the first user device is the owner of the matrix barcode and the corresponding token.

At step 512, the first user device may provide a user interface including an indication that the matrix barcode is associated with a token claimed by the user of the first user device. The indication may be a confirmation to the user than that the user correctly configured the account action associated with the token. The interface may include options permitting the user to modify the account action or to remove the association between the matrix barcode and corresponding token and the user account.

At step 513, the first user device 103 may receive input from the user indicating modifications to be made to the account action. The user may, for example, interact with one or more interactive elements in the user interface to modify the account action. Available modifications may be dependent on the type of account action that the user originally selected for the matrix barcode and corresponding token.

For example, if the action was to transfer an amount of funds to an account of the user, the action may be to modify the target account or the amount of funds. Available modifications may include changing the type of the action. For example, the elements may allow the user to change the action from a funds transfer to an advertisement. At step 514, based on the input received from the user, the first user device 103 may initiate a request to modify the account action involving the user account. The first user device 103 may collect the modifications requested from the user and transmit the modifications to the payment service system 108.

In particular embodiments, the payment service system 108 may include methods to detect and prevent fraud or theft of a payment transaction. For example, a payment service system 108 may include techniques to detect irregular modification requests and require confirmation via a second, backup channel of communication. The payment service system 108 may receive instructions that include a requested modification to an action associated with a token. The payment service system 108 may analyze the request and determine that additional verification is required before the payment service system 108 will make the request modifications. For example, the payment service system may receive a request to modify the designated receiving account for transfers of funds as a result of interaction with a matrix barcode. The payment service system may automatically determine that any such modification requires verification. As another example, the payment service system 108 may analyze contextual information associated with the modification request instructions. The payment service system 108 may determine that the request is associated with location not previously associated with the user, is made at an usual time, or is made from a device not previously associated with the user's account. The payment service system may determine that there is an increased likelihood that the user's account has been comprised and may send a verification message to the user via a second (e.g., backup communication channel). A backup communication channel may be a push notification delivered to an instance of the payment application on a device other than the device from which the request initiated, a message delivered (e.g., via a short message service, electronic mail, or third-party application) to a designated backup address, or a request that the user verify their identity in some other way. Prior to receiving a confirmation message verifying the transaction, the payment service system 108 may prevent any transactions to occur that involve the modification. The payment service system 108 may even freeze all transactions will the account until the user is able to verify their identity. After receiving the confirmation message, the payment service system may proceed to step 524.

At step 524, the payment service system 108 may receive the request to modify the account action from the first user device 103. The payment service system 108 may interpret the request to determine the nature of the modifications to be made. At step 525, the payment service system 108 may apply the requested modifications to the account action involving the user account associated with the matrix barcode and corresponding token. The payment service system may update a data structure storing the claimed token in association with a list of actions to be performed when another user interacts with the token.

Figure 6:
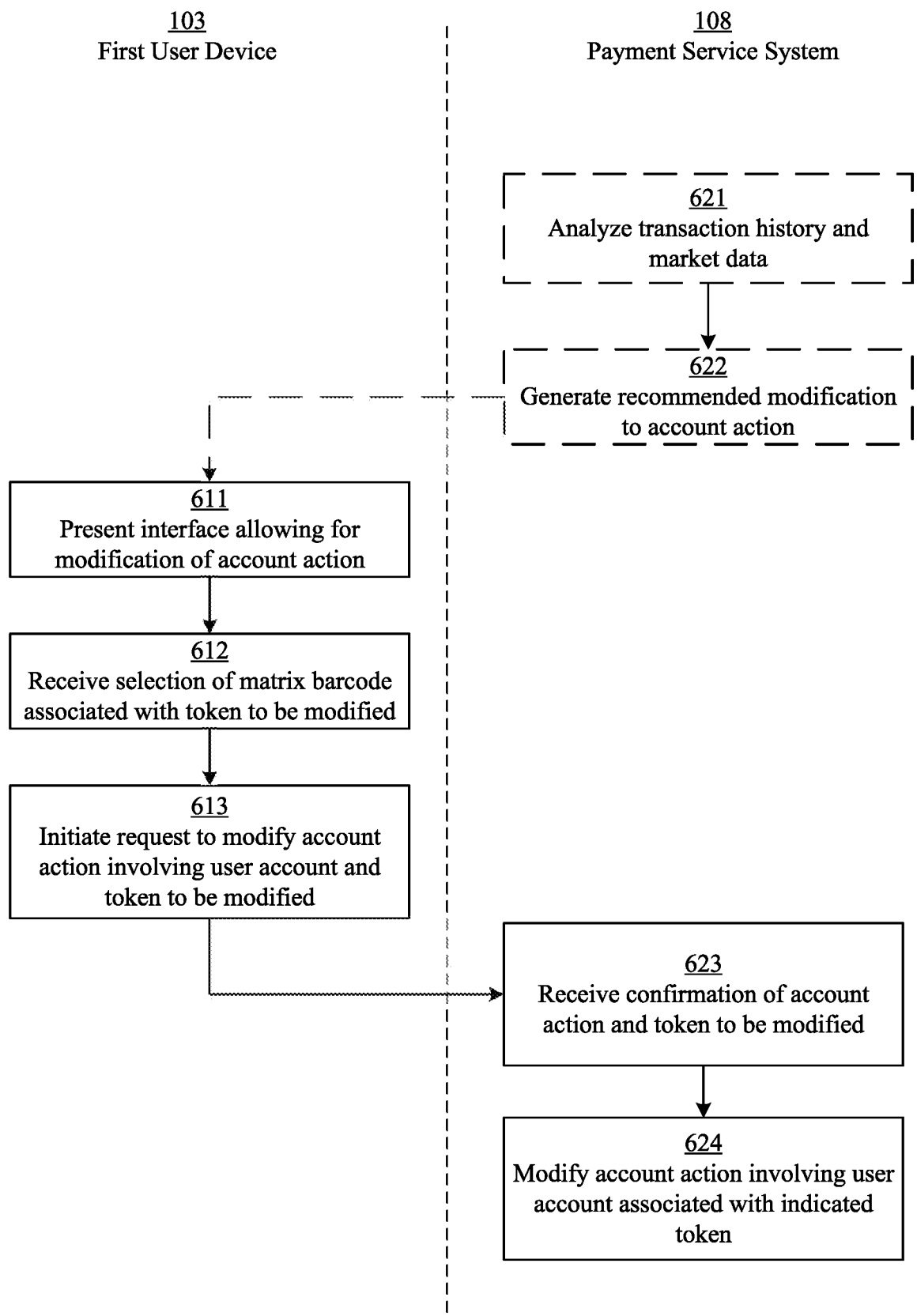
FIG. 6 illustrates an example method for modifying an account action associated with a pre-generated matrix barcode.

FIG. 6 illustrates interactions between devices for an example process involving modifying the account action associated with a matrix barcode and corresponding token. In the example interactions shown in FIG. 6. The user is not required to first interact with the matrix barcode again before they can modify the account action associated with the matrix barcode and corresponding token. For example, the user may modify the account action associated with the matrix barcode and corresponding token through an application associated with the payment service and executing on the first user device or through a webpage associated with the payment service. Additionally, the user may be able to modify the account action based on recommendations for account modifications made by the payment service and sent to be reviewed by the user.

The interactions for the process shown in FIG. 6 may begin with the payment service system 108. At step 621, the payment service system 108 may analyze the transaction histories and market data related to the user. In particular embodiments, the payment service system may perform the analysis on data that is relevant to a particular user and to a particular account action that has been selected by a user to be associated with a matrix barcode and corresponding token. The payment service system 108 may perform the analysis with the intent of determining improvements that may be made to the associated account action. The payment service system 108 may have access to a variety of transactional information related to the spending and money-transferring habits of the users of the payment service. The payment service system 108 may analyze that information to determine possible improvements. The payment service system 108 may analyze transaction history, market data, and other relevant information to identify trends in the data that are relevant to a particular user or to a particular action associated with a matrix barcode and corresponding token. The trends may be based on any suitable data stored therein, including, but not limited to, times of transactions, dates of transactions, amounts of funds transferred, the identities of users involved, the location of an interaction leading to the transaction, and other related information. The payment service system 108 may be given particular performance indicators, such as amount of money transfer to the particular user or number of transactions completed, to optimize. These performance indicators may be specified by the user or may be applied on a system-wide level. For example, a musician may have set up an account action so that users are provided an method to tip them $3 via the payment service when they interact with the barcode. The payment service system 108 may analyze data such as a location and time of day when the musician typically receives the most tips. The payment service system 108 may compare that information for the musician to tipping transactions placed at the same or similar locations and at the same or similar times of day.

At step 622, the payment service system 108 may generate one or more recommendations for modifications to the account action associated with a matrix barcode and corresponding token. The result of the analysis performed by the payment service system 108 may be one or more recommendations to optimize the performance indicators provided to the payment service system 108. Continuing the example of the musician, the payment service system 108 may determine that the musician typically receives tips at a particular coffee shop during lunch on the weekdays. The payment service system 108 may recommend lowering the recommended tip amount associated with a matrix barcode and corresponding token based on a comparison of the amount tipped at similar coffee shops at the same time or at the same coffee shop at different times. The payment service system 108 may have concluded that the musician's suggested tip amount was causing users to prefer to cancel the transaction over completing the tip. The payment service system 108 may send the recommendation to modify the account action to the first user device 103.

At step 611, the first user device may present an interface through which a user may modify an account action associated with a matrix barcode and corresponding token. In particular embodiments, the first user device 103 may present the user interface as the result of receiving a recommended modification from the payment service system 108. In particular embodiments, the first user device 103 may present the user interface as the result of a user's interaction with the first user device 103. As noted in FIG. 6, steps 621 and 622 are optional and are not required for a user to be able to modify an account action associated with a matrix barcode and claimed corresponding token. As part of the interface, the first user device 103 may present multiple matrix barcodes associated with tokens claimed by the user when the user has claimed multiple tokens. The user may want only to modify one account action, and thus the interface allows the user to choose which. At step 612 the first user device 103 may receive a selection of the matrix barcode associated with the token with an action that is to be modified. The first user device 103 will also receive a specification of the modification to be made. In particular embodiments, the modification may be the result of a recommendation provided by the payment service system 108 (e.g., in step 622). At step 613, the first user device 103 may initiate a request to modify the account action associated with the selection matrix barcode and corresponding token. The first user device 103 may send the request to the payment service system.

At step 623, the payment service system may receive the request. If the payment service system 108 previous provided a recommendation, the request may merely be confirmation of the user's acquiescence to the recommendation. The request may include the claimed token (or identifier), the matrix barcode (or identifier), and details of the modification such as the specification of the account action or account-action dependent information. The account-action dependent information may include, for example, the amount of funds to be transferred, the identity of the account to which the funds will be transferred, the timing of the transaction, follow-up information to be delivered, and other suitable information. At step 624, the payment service system 108 may modify the account action involving the user account associated with the matrix barcode and corresponding token indicated by the request. The payment service system may update records in a data structure that identify and provide the details for the account action.

In particular embodiments, a user may claim a matrix barcode and corresponding token. In claiming the matrix barcode and corresponding token, the user may specify that one or more actions occur, or are recommended, when another user interacts with (e.g., scans) the matrix barcode. The actions may be specified by the user when the first claim the matrix barcode and corresponding token and may further be modified by the user at will. The payment service system may communicate with an associated application executing on a mobile device of the user to facilitate specification and modification of actions associated with a particular matrix barcode and corresponding token.

In particular embodiments, the action specified may involve an interaction between an account of the first (e.g., claiming) user and an account of the second (e.g., scanning) user. Based on the type of action, confirmation may be required by one or more of the users. For example, if the action involves a transfer of funds from one user to another, then confirmation may be required by the transferring user before the transfer is initiated. Certain actions may provide merely a notification to one or more of the users, without requiring confirmation before it can proceed. For example, if the action involves a scanning user adding a claiming user to a contact list, the scanning user may simply be notified that the action has occurred. Actions may provide notification and confirmations mixed as appropriate. For example, a transferring user may receive both a confirmation of the transfer and may receive a notification once the transfer is completed. Similarly, the receiving user may receive a notification that the transfer has occurred.

The action involving accounts of the first user and the second user may be dependent on a context of the interaction with the matrix barcode and corresponding token. The context may include information about the time and location of the interaction. For example, the context may include the time of the interaction, the location of the interaction, identification of one or more merchants near the location associated with the interaction, identification of events registered to be occurring near the interaction (e.g., from a merchant's profile or from a user's profile), and other suitable information. The context may include information about the interacting user. For example, the context may include an identity of the interacting user, information from a customer profile associated with the user, an account of the interaction user, etc. The context may include information about the interacting device. For example, the context may include an identity of the device, including a manufacturer or model of the device, the application responsible for the interaction (e.g., a third-party application or an application associated with the payment service).

Figure 7:
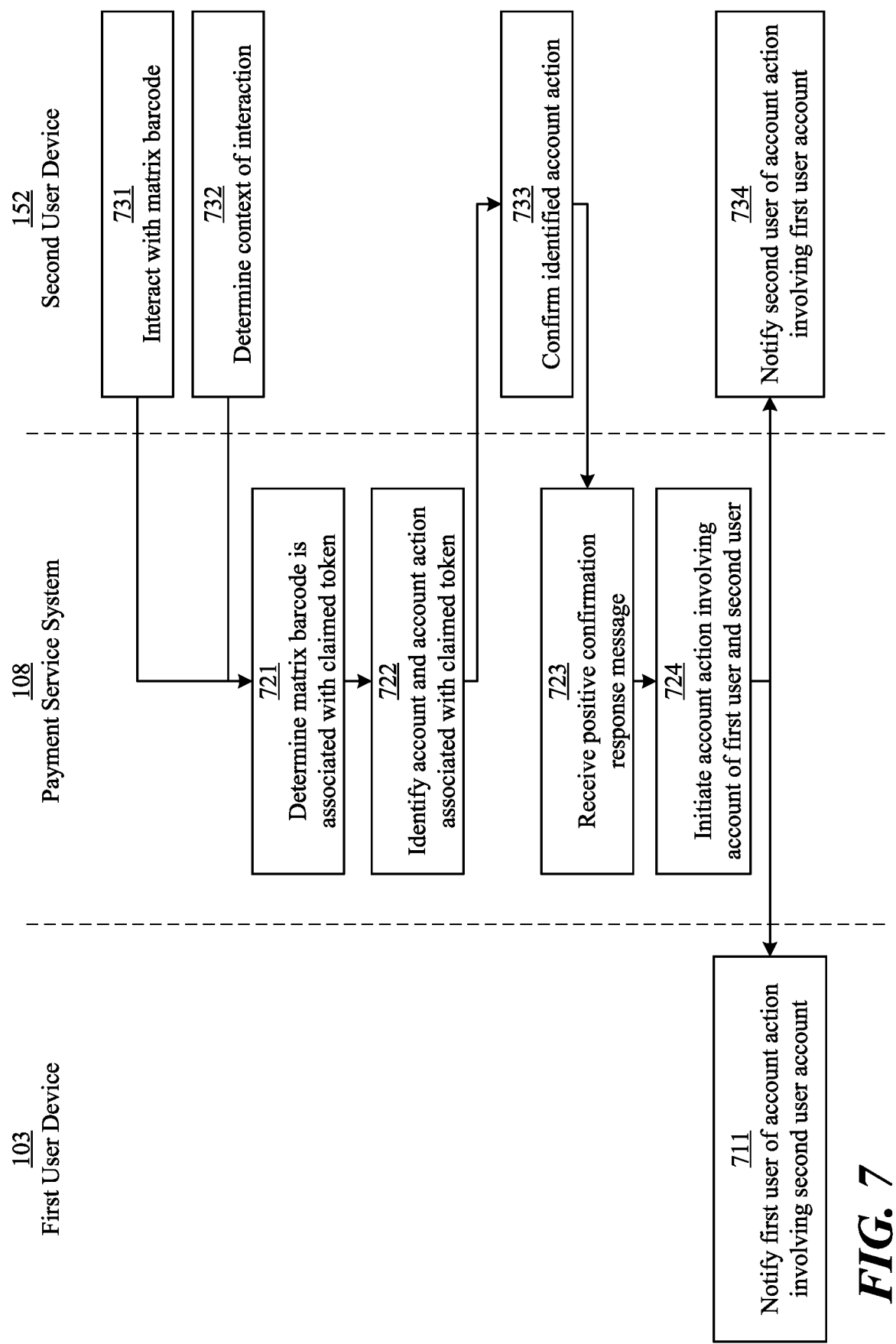
FIG. 7 illustrates an example method for initiating an account action based on interaction with a matrix barcode.

FIG. 7 illustrates interactions between devices for an example process involving the operation of an action involving accounts of a first and second user based on interactions with a matrix barcode. Prior to step 731, a first user device 103 has been used to claim matrix barcode and corresponding token (e.g., according to the processes described above). As part of the claiming process, the user of the first user device has specified one or more accounts to be executed when another user interacts with the matrix barcode and corresponding token. A payment service system 108 or related subsystems may store the requested action and user account (or an identifier therefor) in association with the token corresponding to the matrix barcode.

At step 731, a second user device 152 may interact with the matrix barcode. As described above, the second user device may interact with the matrix barcode through an application executing on the second user device 152. The application may be an application associated with the payment service or may be a third-party application capable of interacting with a matrix barcode. At step 732, the second user device 152 may determine a context of the interaction. The context may be determined based on the time or location of the interaction, the identity of the interacting user, the interacting device, or other suitable factors. The second user device 152 may send the matrix barcode and the associated context to the payment service system 108. The second user device 152 may also interpret the matrix barcode to identify the corresponding token and transmit the corresponding token to the payment service system 108. In particular embodiments, rather than determine the context of the interaction, the second user device 152 may merely collect the contextual information, such as the time or location of the interaction, the identity of the interacting user, and interacting device, and other suitable factors, and send the collected information to the payment service system 108. In such an embodiment, step 732 (determining the context) may be performed by the payment service system 108.

Prior to step 721, the payment service system 108 may receive the matrix barcode (or corresponding token) and determined context of the interaction. At step 721, the payment service system may determine that the received matrix barcode is associated with a claimed token. To determine that the matrix barcode is associated with a claimed token, the payment service system 108 may interpret the matrix barcode to identify the claimed token. Alternatively, the payment service system 108 may not need to interpret the matrix barcode if the claimed token has been received from the second user device 152. The payment service system 108 may query a data structure storing claimed tokens and associated information using the claimed token. The payment service system 108 may determine that the token is claimed if the query returns information, such as an identified account and account actions. On the contrary, if the query either returns no information or returns a positive identification that the token is not claimed, then the payment service system 108 may determine that the token is not claimed.

After determining that the received matrix barcode is associated with a claimed token, at step 722, the payment service system 108 may identify the account associated with the token based on the information retrieved from the data structure. The payment service system 108 may further identify the account action associated with the claimed token. The account action may be the action that the first user requested to be associated with the claimed token when the first user claimed the token. The payment service system 108 may prepare to execute the identified action. The payment service system 108 may send a message to the second user device 152 identifying the action, the account associated with the claimed token (e.g., the account of the first user), and other pertinent information. For example, the payment service system 108 may send a confirmation message to the second user device 152 identifying the first user and a recommended amount to transfer to the user (e.g., a monetary amount as a tip).

The second user device 152 may display the received information to the user as a confirmation request message. The message may be displayed as a part of an interactive notification or other user interface including interactive elements. The message may include information about an account (e.g., financial account) of the second user. The information may include an identification of the account (e.g., if the second user maintains multiple accounts), a source of the funds (e.g., if the second user has an account with the payment service and another account with a third-party), and a current balance of the account of the second user. The second user may agree with the details of the transaction, such as the first user, the recipient account of the first user, and the amount to be transferred. The second user may acknowledge confirmation of the transaction through interaction with an interactive element of the user interface. At step 733, the second user device 152 may register the second user's response to the confirmation request message. The second user device 152 may send a confirmation response message to the payment service system 108. In particular embodiments, the second user may disagree with one or more details of the transaction. The user interface may provide interactive elements allowing the second user to refine or correct information. For example, the second user may be provided an interactive element allowing them to choose a different amount to be transferred. The second user may also refuse to complete the account action (e.g., may refuse to transfer funds to the first user). The second user device 152 may send a message to the payment service system 108 denying the account action.

At step 723, the payment service system may receive a positive confirmation response message from the second user device 152. The payment service system 108 may interpret this response as a authorization to perform the action (e.g., to transfer the amount of funds). At step 724, the payment service system 108 may initiate the account action specified by the first user involving the account of the first user and the second user. The payment service system 108 may send a notification to both the first user device 103 and the second user device 152 confirming that the action has been initiated. The payment service system 108 may send one or more other notifications over the processing of the account action. For example, the payment service system may send a notification confirming that the action has been completed. The first user device 103 may receive the notification or notifications. At step 711, the first user device 103 may notify the first user of the account action occurring involving the account of the second user. The notification may take any suitable form, for example a push notification, electronic mail, short message, or message delivered through a payment application executing on the first user device 103. The notification may be delivered substantially immediately, or may be delivered periodically (e.g., as part of a summary of transactions). Similarly, the second user device 152 may receive the notification or notifications. At step 734, the second user device 152 may notify the second user of the account action occurring involving the account of the first user. The notification may be delivered in methods and at times similar to the messages to the first user.

Figure 8A:
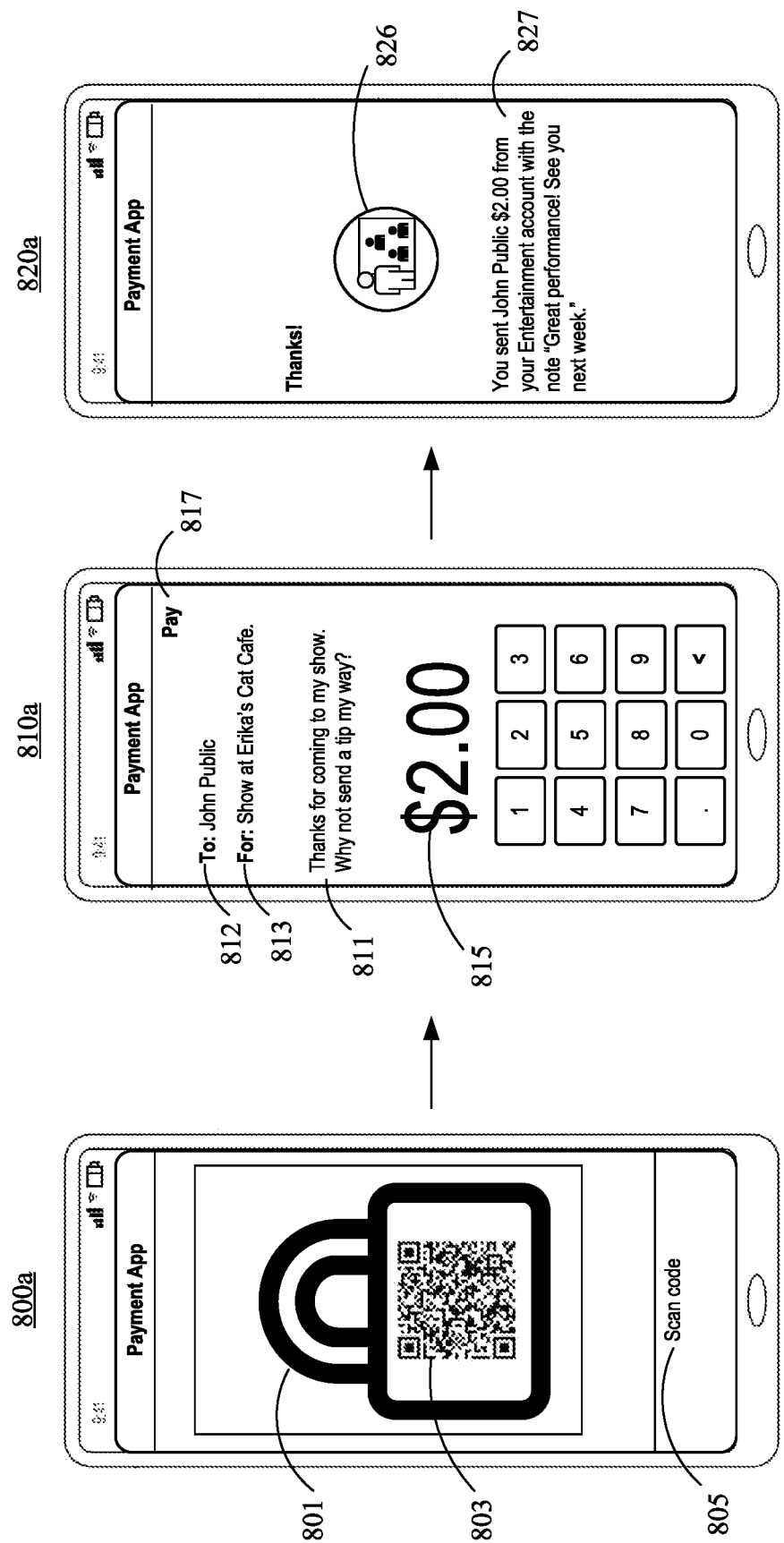

FIG. 8A illustrates several views of an example user interface of a device relating to interaction with a claimed matrix barcode an fulfillment of an associated account action. In interface 800a, payment application associated with a payment service is operating on a mobile device of a user. The payment application provides a camera application allowing a user to, e.g., scan matrix barcodes and display the scanned barcodes in the user interface. The interface 800a provides instructions to the user to "Scan code" in element 805. While using the payment application, the user has scanned a sticker 801 including a matrix barcode 803 using the camera of the payment application.

After the payment application has scanned the matrix barcode 803, the payment application may query the associated payment system to determine whether or not the token associated with the matrix barcode 803 is claimed. The payment application may also send information collected when the payment application scanned the matrix barcode 803. For example, the payment application may send the time or the location of the device that scanned the barcode. The payment service system may query a barcode-identifying database associated with the payment system to determine if the token is claimed (e.g., if the token is associated with an account or account action). In the example illustrated in FIG. 8A, the payment service system may determine that the token is claimed. The payment service system may further determine that the token is claimed by a user, John Public and has been associated with a particular action-transferring funds to a designated account. The payment service system may also analyze the contextual data received from the payment application to compare the contextual data with data specified by the user that claimed the token. Contextual information may include, as an example and not by way of limitation, date, time, device identity, location, scheduled events at the location, and various other information. For example, the user may have designated several locations and associated specific account actions with interactions with the matrix barcode and associated token. The payment service system may select an appropriate account action. The payment service system may inform the payment application of this information. The payment application may transition to interface 810*a*. Interface 810*a* includes an interactive interface of the payment app through which the user can send money to John Public, the user who claimed the token associated with the matrix barcode. Interface 810*a* indicates at an element 812 the name of the user who claimed the token. Interface 810*a* also includes a message from the user who claimed the token at element 811. The message may have been set by the user when the user claimed the token associated with the matrix barcode or may have been modified by the user at a later time. Element 815 includes a recommended amount of money to send to John Public pre-filled in element 815. Element 813 includes a field which the user may use to send a note to John Public or otherwise mark the transfer of funds for their records. The user may modify the information in any of the interactive fields, e.g., elements 813, 815. The user may confirm a transfer of funds by interacting with the "Pay" button, element 817.

After the user interacts with element 817, the payment application may send the information that was stored in the interactive fields to the payment service system to process the account action. In this example, the account action is to send a specified amount of money to the user that claimed the token corresponding to the matrix barcode. The payment service system may receive the information, such as the amount to be transferred, any accompanying note, the identity of the payor and recipient, and other associated information. The payment service system may initiate the transaction and send a notification to the payment application confirming that the transaction has been initiated. The payment application may transition to interface 820*a* which shows a transfer initiated screen. Interface 820*a* includes an image 826 associated with the recipient account and a message 827 explaining the details of the transaction including a customized note sent from the user to the recipient.

Figure 8B:
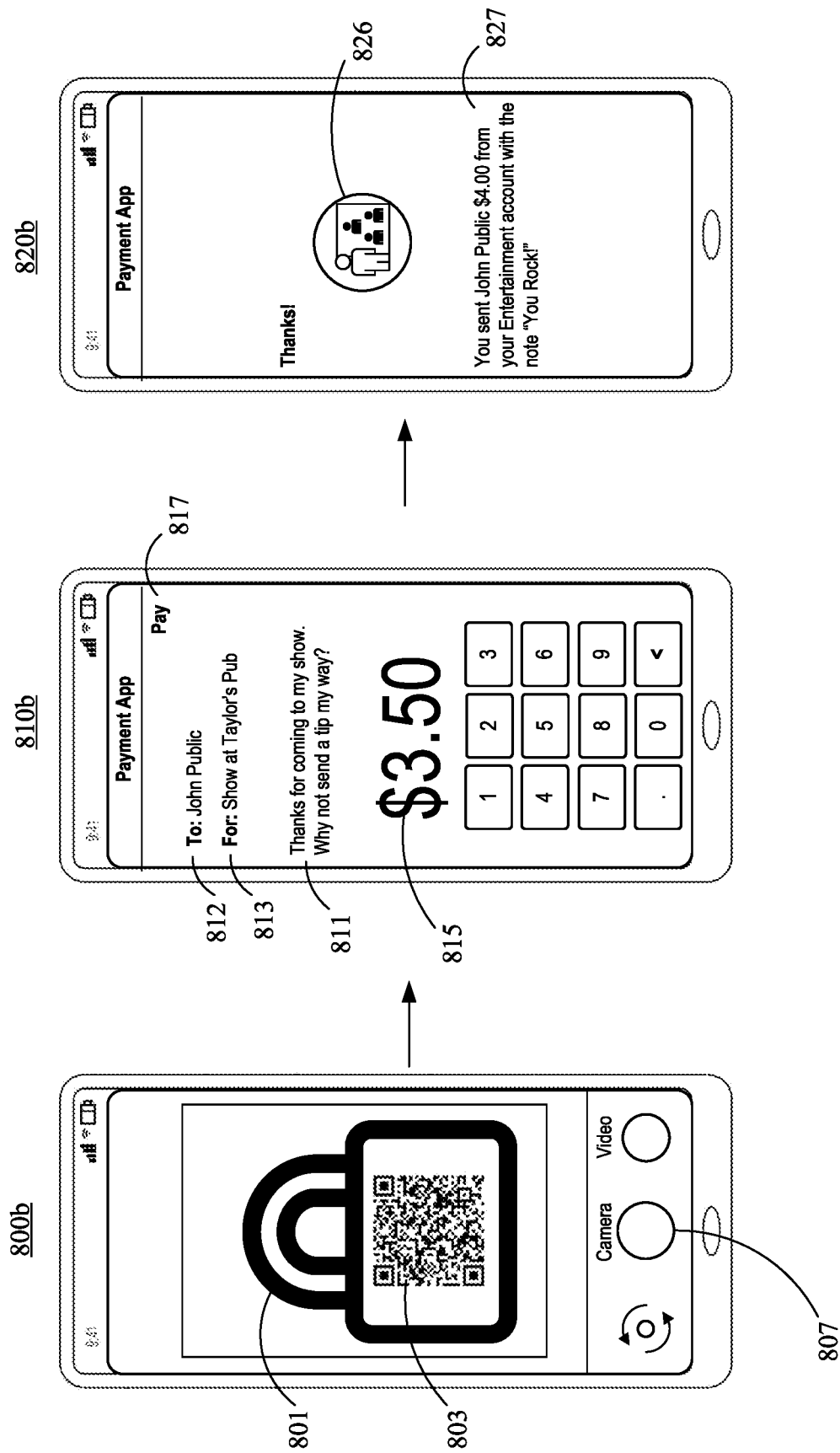

FIG. 8B illustrates several views of an example user interface a device relating to interaction with a claimed matrix barcode and fulfillment of an associated account action. Interface 800*b* shows a third-party application executing a mobile device of a user. The third-party application includes a simulated view finder showing what is being captured by a camera sensor of the mobile device. As shown in the interface 800*b*, the user has caused the matrix barcode 803, embodied in a sticker 801 to be captured by the camera sensor. Interface 800*b* also includes an interactive element 807 that, when selected, causes the camera sensor to save the image shown in the view to a memory of the mobile device.

In the example should in FIG. B, the mobile device of the user has a version of the payment application supporting the interaction with matrix barcodes. The third-party application may interpret a first portion of the matrix barcode and determine that the matrix barcode should be handled by the payment application. The third-party application may pass the matrix barcode (e.g., may decode the matrix barcode and pass the associated information) to the payment application. The third-party application or mobile device may cause the payment application to begin or resume execution on the mobile device of the user. The payment application may take the foreground of operation on the mobile device.

After beginning execution having received the matrix barcode, as described with respect to the example shown in FIG. A, the payment application may query the associated payment system to determine whether or not the token associated with the matrix barcode 803 is claimed. The payment service system may query a barcode-identifying database associated with the payment system to determine if the token is claimed (e.g., if the token is associated with an account or account action). In the example illustrated in FIG. 8B, the payment service system may determine that the token is claimed. The payment service system may further determine that the token is claimed by a user, John Public and has been associated with a particular action-transferring funds to a designated account. The payment service system may also analyze the contextual data received from the payment application to compare the contextual data with data specified by the user that claimed the token. The payment service system may select an appropriate account action. The payment service system may inform the payment application of this information. The payment application may transition to interface 810*b*. Interface 810*b* includes an interactive interface of the payment app through which the user can send money to John Public, the user who claimed the token associated with the matrix barcode. Interface 810*b* indicates at an element 812 the name of the user who claimed the token. Interface 810*b* also includes a message from the user who claimed the token at element 811. The message may have been set by the user when the user claimed the token associated with the matrix barcode or may have been modified by the user at a later time. Element 815 includes a recommended amount of money to send to John Public pre-filled in element 815. Element 813 includes a field which the user may use to send a note to John Public or otherwise mark the transfer of funds for their records. The user may modify the information in any of the interactive fields, e.g., elements 813, 815. Note that, in this example, John has changed the action associated with the matrix barcode and associated token as he has moved to a new performing location after the example shown in FIG. 8A. The user that scanned the matrix barcode did so at the second location. The payment service system presented a different pre-filled amount to transfer, shown in element 815 and a different pre-filled note including the location at element 813 based on John's modifications to the associated actions. The user may confirm a transfer of funds by interacting with the "Pay" button, element 817.

After the user interacts with element 817, the payment application may send the information that was stored in the interactive fields, e.g., 813 and 815, to the payment service system to process the account action. In this example, the account action is to send a specified amount of money to the user that claimed the token corresponding to the matrix barcode. The payment service system may receive the information, such as the amount to be transferred, any accompanying note, the identity of the payor and recipient, and other associated information. The payment service system may initiate the transaction and send a notification to the payment application confirming that the transaction has been initiated. The payment application may transition to interface 820*b* which shows a transfer initiated screen. Interface 820*a* includes an image 826 associated with the recipient account and a message 827 explaining the details of the transaction including a customized note sent from the user to the recipient. The user in this case has modified both the pre-filled note from element 813 and the pre-filled amount to transfer 815 opting to increase the amount transferred.

Figure 8C:
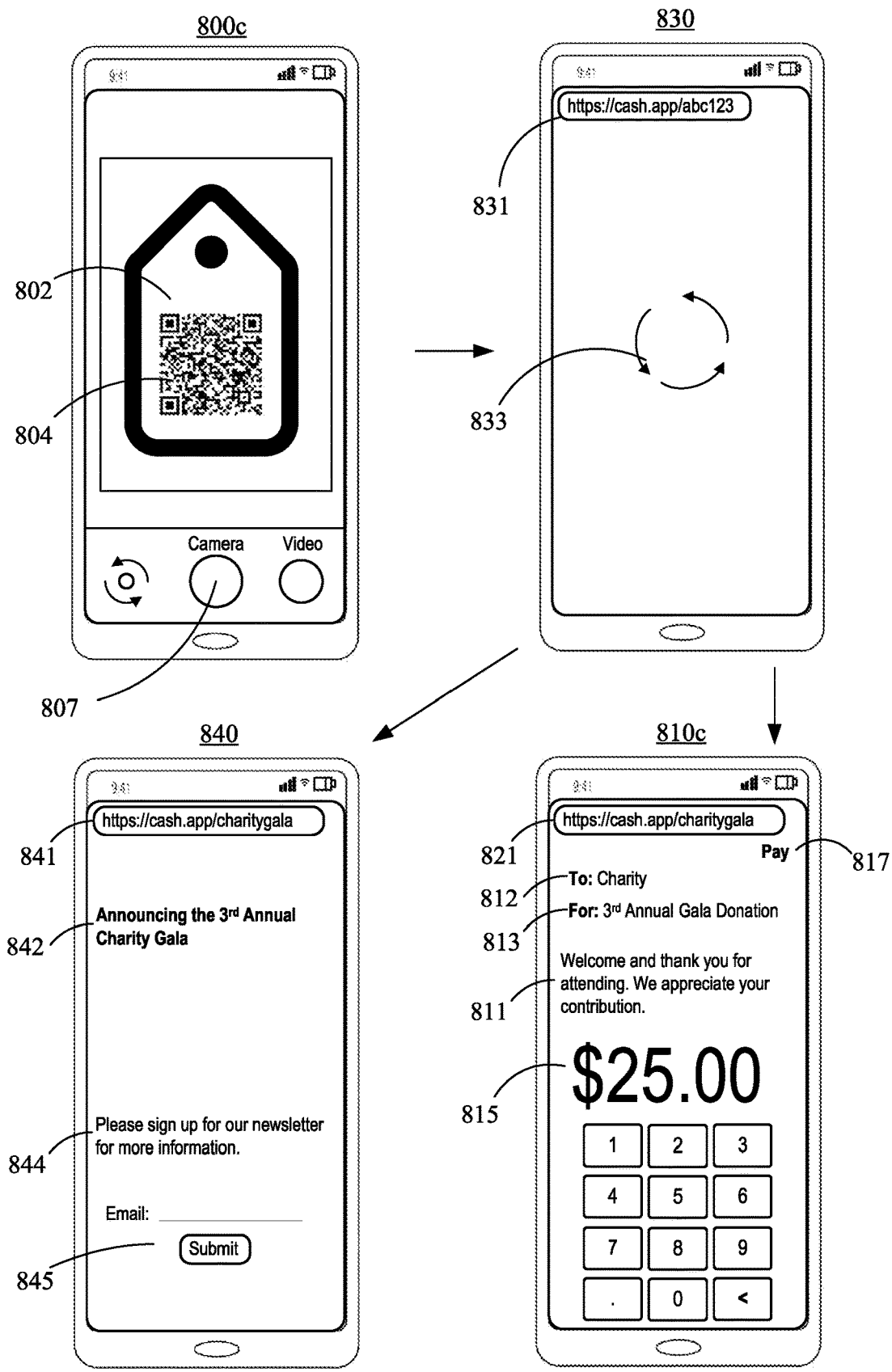

FIG. 8C illustrates several views of an example user interface a device relating to interaction with a claimed matrix barcode and fulfillment of an associated account action. As with interface 800*b*, interface 800*c* shows a third-party application executing a mobile device of a user. The third-party application includes a simulated view finder showing what is being captured by a camera sensor of the mobile device. As shown in the interface 800*c*, the user has caused a matrix barcode 804, embodied in a sticker 802 to be captured by the camera sensor. Interface 800*c* also includes an interactive element 807 that, when selected, causes the camera sensor to save the image shown in the view to a memory of the mobile device.

In the example shown in FIG. 8C, the mobile device of the user does not have a version of the payment application supporting interaction with matrix barcodes. In this example, the matrix barcode, when decoded by the third-party application, may include a URL that can be executed by a web browser of the computing device. When the third-party application scans the matrix barcode, the mobile computing device may prompt the user to launch a web browser to execute the URL. The URL may be uniquely matched to the matrix barcode or corresponding token so that when the web browser executes the URL, the payment service system may be notified (e.g., through communication with a web server associated with the payment service). The payment service system may determine whether or not the token associated with the matrix barcode 804 is claimed, as described herein. Interface 830*c* shows the web browser, having executed the URL 831. The interface shows that a web server associated with the payment service is preparing to redirect the web browser through an element 833.

FIG. 8C illustrates two potential actions that may happen next, depending, for example, on context information sent to the payment service system when the web browser sends executes the URL. For example, the payment service system may have determined that the matrix barcode and corresponding token are claimed by a charity. The charity may have affixed this matrix barcode to a variety of their promotional materials. The payment service system may identify the matrix barcode or corresponding token in a data structure and may determine that the charity has established different actions to occur depending on context information. The charity may have set the action to depend on the date and time at which the matrix barcode 804 is interacted with. Similarly, the charity may have set the action to depend on the location of the device that interacts with the matrix barcode. This information may be sent by the device to the payment service system through the web page or after interaction with the webpage.

In a first illustrated example, the payment service system may have received the context information and determined the date and time of the interaction with the matrix barcode 804. The charity may be planning an event to occur on Saturday at 5 μm. The charity may have set the action associated with the token associated with the matrix barcode 804 to be to provide a URL to a landing page advertising the event when the interaction occurs prior to the start of the event. The payment service system may have determined that interaction with the matrix barcode 804 occurred on Thursday. The payment service system may therefore redirect the web browser to web page having a user interface as shown in 840. The user interface 840 includes the URL 841 of the webpage to which the web browser was redirected. The user interface 840 includes information 842 announcing the charity event and providing other identifying information for the charity. The user interface 840 also includes a request 844 that the user submit their email address for more information through a number of interactive elements 845. In another example, the action associated with the claimed token may have been to retrieve an identifier for a communication method (e.g., email address, phone number, social media handle) associated with the user who interacted with the matrix barcode 804 and automatically send the user detailed information via the communication method.

In a first illustrated example, the payment service system may have received the context information and determined the date and time of the interaction with the matrix barcode 804. This time, the interaction may have occurred on Saturday at 6 pm, after the start of the charity event. Additionally, the payment service system may have determined the location of the interaction based on location information received from the interacting device. The charity may have established a location associated with the charity event, such as by designating a geo-fence around the event. The charity may have associated interactions with the matrix barcode 804 after the start of the event and at or near the location associated with the event with an action facilitating a transfer of money from the interacting user to the charity. The payment service system may determine that these conditions are satisfied and therefor redirect the web browser executing on the interacting device to a web page with a user interface 810*c*. The user interface 810*c* may be configured to facilitate financial transfer between persons who do not have a version of an application associated with the payment service that supports interacting with matrix barcodes. The user interface 810*c* includes the URL 821 to which the web browser executing on the interacting device was directed. The user interface 810*c* includes a field 812 with information identifying the charity as a recipient of a financial transfer and another field 811 where the charity may enter a custom note to potential donors. The user interface 810*c* also includes an interactive element 813 through which a user may specify a note to send with the transfer and another interactive element 815 through which a user may select the amount of money they wish to transfer. After the user updates the information, the user may interact with the pay button element 817 to initiate the financial transfer.

FIG. 8D illustrates several views of an example user interface a device relating to interaction with a claimed matrix barcode. As with interface 800*b*, interface 800*d* shows a third-party application executing on a mobile device of a user. The third-party application includes a simulated view finder showing what is being captured by a camera sensor of the mobile device. As shown in the interface 800*b*, the user has caused a matrix barcode 803, embodied in a sticker 801 to be captured by the camera sensor. Interface 800*d* also includes an interactive element 807 that, when selected, causes the camera sensor to save the image shown in the view to a memory of the mobile device.

In the example shown in FIG. 8D, the mobile device of the user does not have a version of the payment application supporting interaction with matrix barcodes. In fact, the mobile device of the user does not have the payment application associated with the payment service installed on the device. In this example, the matrix barcode, when decoded by the third-party application, may include a URL that can be executed by a web browser of the computing device. When the third-party application scans the matrix barcode, the mobile computing device may prompt the user to launch a web browser to execute the URL. The URL may be uniquely matched to the matrix barcode or corresponding token so that when the web browser executes the URL, the payment service system may be notified (e.g., through communication with a web server associated with the payment service). The payment service system may determine whether or not the token associated with the matrix barcode 803 is claimed, as described herein. Interface 830c shows the web browser, having executed the URL 831. The interface shows that a web server associated with the payment service is preparing to redirect the web browser through an element 833.

In this example, the payment service system may require that a user be registered through the payment service or have the application associated with the payment service installed on the interacting mobile device. Because the payment service system was prompted that the matrix barcode 803 had been interacted with through a web server (e.g., instead of the payment application handling the URL), the payment service system may determine that the user has not installed the payment application. The payment service system may cause the webserver to redirect the web browser executing on the mobile device of the user to a web page that prompts the user to install the payment application. In the example shown in FIG. 8D, the payment service system may determine that the account action associated with the token associated with the matrix barcode 803 is to transfer funds to a specified user's account. The payment service system may, through the web server, redirect the web browser executing on the mobile device of the user to a web page having a user interface 850. The user interface 850 includes a landing page URL 850 associated with the user. The payment service system may include elements such as 816 and 817 containing identifying information for the user. This may help the interacting user to understand why they were redirected to this web page. The user interface 850 may include elements such as 818 explaining the action associated with the token associated with the matrix barcode 803. Finally, the user interface 850 includes an interactive element 819 that will prompt the user to install the payment application associated with the payment service on the mobile device. For example, interaction with the element 819 may cause the mobile device to launch an application store for the mobile device to the page from which the user may install the payment application.

Figure 9:
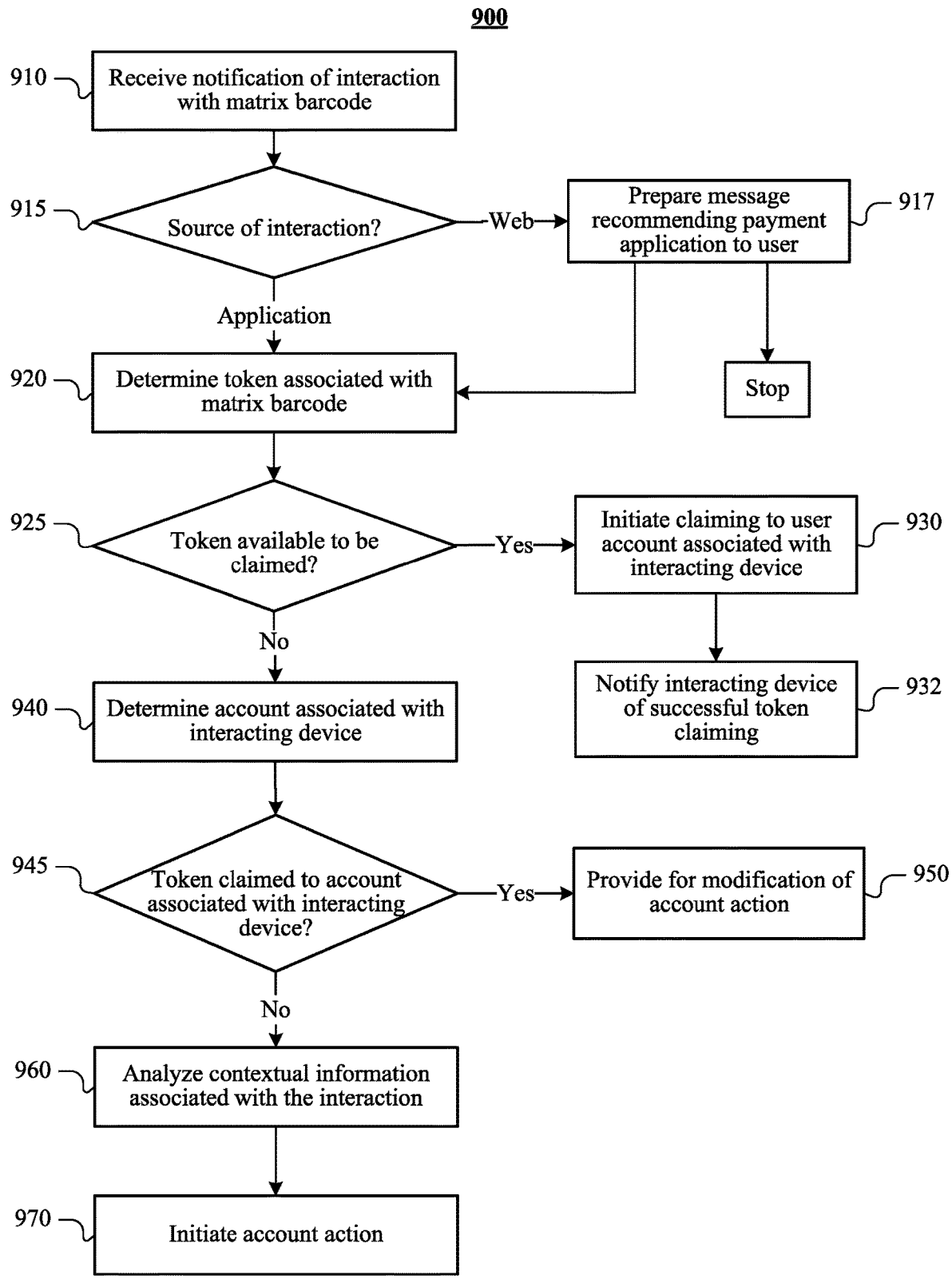
FIG. 9 illustrates an example method for performing actions based on interactions with a matrix barcode.

FIG. 9 illustrates an example method 900 for performing actions based on interactions with a matrix barcode. In particular embodiments, the payment service system 108 may store or be associated with storage of a plurality of matrix barcodes stored in associated with tokens. For example, the matrix barcodes may be stored in a token association structure 134. In particular embodiments, the payment service system 108 may have access to a token association structure 134 (e.g., through one or more APIs). The payment service system 108 may also be associated with one or more instances of a payment application (e.g., payment application 107) executing on one or more user mobile devices (e.g., mobile device 103).

The method may begin at step 910, where the payment service system 108 may receive a notification of an interaction with a matrix barcode or a token corresponding to matrix barcode. The notification may be received from a device associated with a user, such as a mobile device 103. The notification may be received through any suitable form of communication, including but not limitation to, communication over one or more APIs, short message electronic mail, and through one or more wired or wireless connections. The message of the notification may indicate a matrix barcode, associated token, or other suitable identifier for the matrix barcode. The payment service system 108 may receive the notification, e.g., from a mobile device 103, webserver associated with the payment service system 108, another system associated with the payment service system 108, or a third-party system or service.

After receiving the notification, at step 915, the payment service system 108 may determine the source of the interaction. As describe above, the payment service system 108 may be associated with one or more mobile applications (e.g., application 107) executing on one or more mobile device 103. The payment service system 108 may be in communication with the application 107. The application may be configured to be capable of capturing and interpreting (e.g., interacting with) matrix barcodes. When the application interacts with the matrix barcode, the message notifying the payment service system 108 of the interaction may be specially configured so that the payment service system 108 can determine that the interacting mobile device 103 has a suitable payment application 107 installed. In particular embodiments, the matrix barcode may be configured to be read using any suitable matrix barcode-reading application. For example, many smartphones have the functionality to read matrix barcodes pre-installed. If the mobile device 103 has the payment application 107 installed and interacts with the matrix barcode through any other method, the mobile device 103 may cause the payment application 107 to begin executing on the mobile device 103. The payment application 107 may send the corresponding message to the payment service system 108, allowing the payment service system 108 to determine the source of the notification as being from a mobile payment application 107 executing on a mobile device 103. The payment service system 108 may then proceed to step 920.

The payment service system 108 may also be associated and in communication with one or more webservers. The payment service system 108 may also be in communication with a variety of other related systems or applications. In particular embodiments, the matrix barcode may be configured to be read using any suitable matrix barcode-reading application. For example, many smartphones have the functionality to read matrix barcodes pre-installed. Thus, a mobile device may be able to interact with a matrix barcode regardless of whether an instance of the payment application 107 is installed on the mobile device. Interacting with the matrix barcode may, in this instance, cause a URL to be executing by a web browser executing on the mobile device. Executing the URL may cause a webserver associated with the payment service system 108 to notify the payment service system 108 of the interaction. In response, the payment service system 108 may determine that the source of the interaction was through the web browser (or other suitable widely available matrix barcode interpreting function). In response to determining that the notification originated from a web browser or webserver, the payment service system 108 may proceed to step 917.

At step 917, the payment service system 108 may prepare a message recommending the use of the mobile payment application 107 to the user 104. The message may be delivered to the mobile device of the user through a webserver, e.g., the webserver may provide a webpage to the web browser containing the message. The message may provide methods for the user to install the payment application 107 on the mobile 103. In some embodiments, the method may stop. For example, the payment service system may require the use of a mobile payment application 107 to interact with a matrix barcode provided by the payment service system 108. In some embodiments, the method may continue to step 920.

At step 920, the payment service system 108 may determine the token associated with the matrix barcode. In particular embodiments, the notification received by the payment service system 108 may include the related token identifier (e.g., the matrix barcode may be encoded with the token identifier. The payment service system 108 may then verify that the token identifier is a valid token and/or is associated with a token. In particular embodiments, the notification may include the matrix barcode (e.g., as an image). The payment service system 108 may decode the matrix barcode and identifier from the barcode a token. The token may be one representing only the matrix barcode (e.g., if the matrix barcode and token are each randomly generated and later associated). The token decoded from the matrix barcode may directly indicate the associated token. The payment service system 108 use the information included in the notification of interaction with the matrix barcode to query a data structure containing the associations between matrix barcodes and tokens.

At step 925, the matrix barcode may determine whether the token associated with the matrix barcode is claimed or available to be claimed. For example, in querying the data structure, the payment service system 108 may receive a null response. The payment service system 108 may receive a token "abc123" and query the data structure. The data structure may only store token associations when an association has been made. Therefore, the result from the data structure for the unclaimed token "abc123" will be null. As another example, the data structure may store all tokens generated and may return a response indicating that the token has not been claimed (e.g., that it is available). If the token is available to be claimed, the payment service system 108 may proceed to step 930.

At step 930, the payment service system 108 may optionally initiate a process through which the token can be claimed by the account of the user 104 of the mobile device 103. The payment service system 108 may determine the account of the user in a variety of methods. For example, the user may have been logged into the mobile payment application 107. The account identifying information may be sent with or after the notification that the mobile device has interacted with the matrix barcode. Similarly, if the notification was delivered via interaction with a web browser, a user may have logged into a web page associated with the payment service system 108. The account identifying information may likewise be sent to the payment service system 108. In particular embodiments, after the token is identified as being available for claiming, the payment service system 108 may request the user to identify their account. The payment service system 108 may request the user to provide authentication credentials so that the user can manage their account. The payment service system 108 may request the user enter other identifying information (e.g., a unique identifier for the account such as an account name or number) without the necessarily providing authentication credentials. After identifying the account of the user, the payment service system 108 may update the data structure containing associations between user accounts and tokens to indicate an association between the identified account of the user and the token. The payment service system 108 may also indicate an account action to be taken when the matrix barcode is later interacted with. Possible account actions have been described herein. The payment service system 108 may indicate this account action by updating an appropriate data table in a related data structure. At step 932, the payment service system 108 may provide a notification to the mobile device indicating that the token has been successfully claimed and that the matrix barcode will now be associated with their account.

Returning to step 925, the payment service system 108 may have determined that the token is already associated with another account, e.g., that it is not available to be claimed. The payment service system 108 may proceed to step 940. At step 940, the payment service system 108 may determine a user account associated with the interacting device. As described above, the user may be logged into the instance of the payment application 107 executing on the mobile device 103. The user may be logged into the web page that originated the notification to the payment service system 108. The user may also be asked to provide authentication credentials or other account identifying information (e.g., an account name, a unique proxy, or account number).

At step 945, the payment service system 108 may compare the account associated with the identified token (e.g., the token associated with the interacted with matrix barcode) to the token associated with the identifying device determined in step 940. If the accounts match, or if the same user is responsible for both accounts, the payment service system 108 may proceed to step 950. If the accounts do not match (or if different users are responsible accounts) the payment service system may proceed to step 960.

At step 950, the payment service system 108 may interpret the interaction as a request by the user to manage their matrix barcode. The payment service system 108 may provide instructions causing an interface through which the user may modify settings associated with the matrix barcode and corresponding token. For example, the user may be permitted to disassociate the claimed token and matrix barcode from their account. As another example, the user may desire to modify the account action associated with the token. Depending on the action chosen to be associated with the token, an account action modification may include modifying values (e.g., a recommended amount of money to transfer), or completely altering the action (e.g., changing the action from a money transfer to an advertisement or email collection).

At step 960, the payment service system 108 may analyze contextual information associated with the interaction with the matrix barcode. In particular embodiments, the contextual information may be collected and sent with the notification of the interaction of the matrix barcode, the identifying account information, or during any other suitable step of the method 900. The contextual information may only be collected according to privacy policies of the user. For example, the user may preemptively authorize some information (e.g., time of interaction) to be sent when their mobile device interacts with a matrix barcode. The user may selectively authorize some information to be sent (e.g., the location of the device when they interact with the matrix barcode). The user may also block contextual information from being sent. Analyzing the contextual information may include comparing the contextual information to prespecified conditions associated with the claimed token. For example, the user to whom the token is claimed may have indicated that at a first time a first action should be token, and at a second time a second action should be taken. The payment service system 108 may compare the contextual information and determine which action should be taken.

At step 970, the payment service system 108 may initiate the account action associated with the claimed token based on any satisfied conditions. For example, the payment service 108 system may cause funds to be transferred from a first account (e.g., the account of the interacting user) to a second account (e.g., the account of the user who claimed the token). As another example, the payment service system 108 may provide a notification of one or both of the users according to the account. The action may be finally contingent on receiving approval or confirmation from A variety of other suitable account actions may be performed. The payment service system 108 may then await further notifications of interaction with matrix barcodes.

Figure 10:
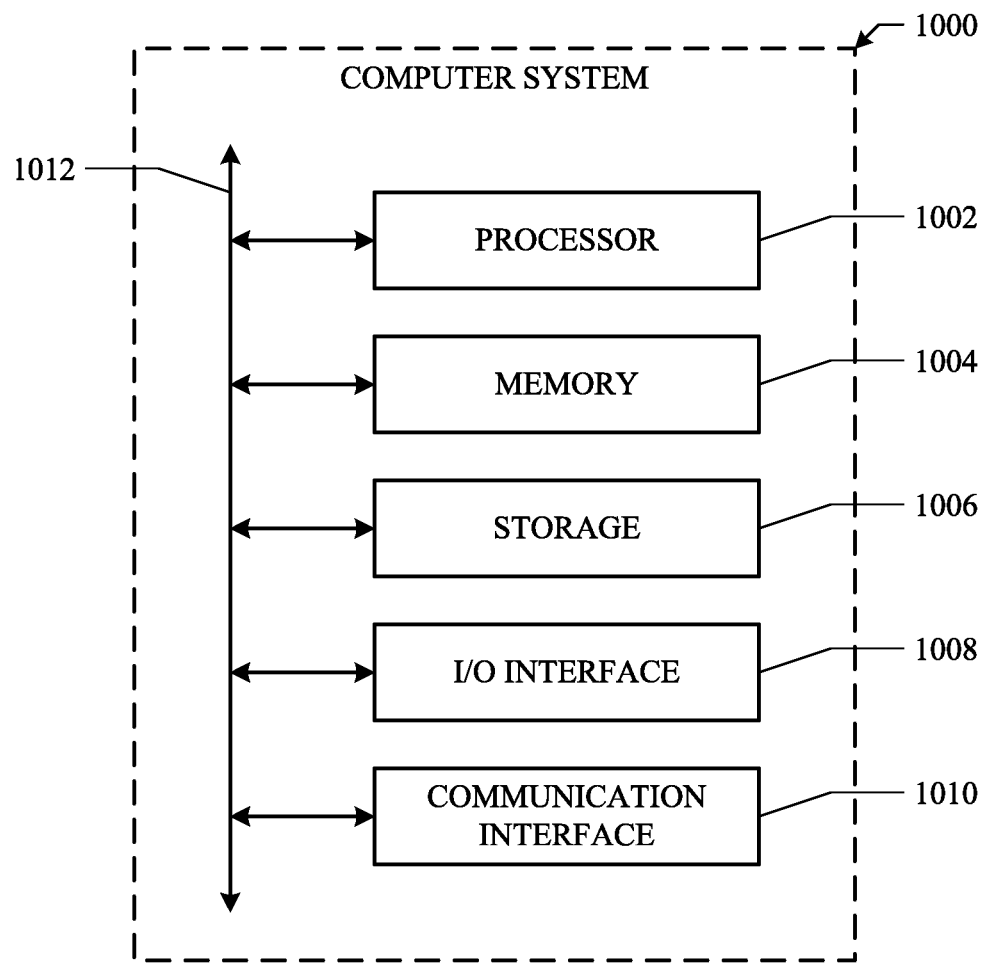
FIG. 10 illustrates an example computer system.

FIG. 10 illustrates an example computer system 1000. The computer system 1000 may be a computer system associated with the payment service system 108, POS device 105, or customer device 103. While these devices may have components in common, such as those illustrated in FIG. 10, it should be appreciated that each of the payment service system 108, POS device 105, or customer device 103 may be specialized devices configured for their specific purposes. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As an example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems *00 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a payment service computing platform associated with a payment service:
receiving, from an application executing on a first electronic device of a first user of the payment service, a request to generate a matrix barcode, wherein the payment service computing platform has a first database of generated matrix barcodes and a second database of tokens, each of the tokens being configured to be associated with one of the generated matrix barcodes;
selecting a token from among the tokens in association with the matrix barcode;
receiving, from the application, instructions to associate an action with the token corresponding to the matrix barcode, the action involving a first account associated with the first user;
associating the token with the action and the first account associated with the first user;
receiving, from a second electronic device of a second user of the payment service, the token and a first set of contextual information, wherein the token is received subsequent to an interaction with the matrix barcode by the second electronic device;
identifying the action associated with the first matrix barcode based at least in part on the token and the first set of contextual information;
causing a user interface to be displayed on the second electronic device, wherein the user interface comprises one or more interface elements for collecting payment information from the second user for initiating a payment to the first user;
receiving the payment information of the second user; and
initiating the payment to the first user based at least in part on the payment information of the second user.

2. The method of claim 1, wherein the user interface is customized prior to display on the second electronic device based at least in part on the first set of contextual information or information embedded within the matrix barcode.

3. The method of claim 1, wherein the action is further associated with a specified time,
wherein the first set of contextual information comprises a current time, and
wherein identifying the action associated with the first matrix barcode based at least in part on the token and the first set of contextual information comprises comparing the current time and the specified time.

4. The method of claim 1, wherein the action is further associated with a specified location,
wherein the first set of contextual information comprises a current location associated with the second electronic device, and
wherein identifying the action associated with the first matrix barcode based at least in part on the token and the first set of contextual information comprises comparing the current location and the specified location.

5. The method of claim 1, further comprising:
associating the token with at least one additional action by the payment service involving the first account,
wherein the action and each at least one additional action is associated with respective contextual information, and
wherein identifying the action associated with the first matrix barcode comprises selecting the action based on comparison of the first set of contextual information and the respective contextual information associated with the action and each at least one additional action.

6. The method of claim 1, wherein the instruction to associate the token corresponding to the matrix barcode with the action by the payment service is received subsequent to a first interaction with the matrix barcode by the first electronic device.

7. The method of claim 1, further comprising:
receiving, from the application executing on the first electronic device of the first user, an instruction to modify the action by the payment service associated with the token; and
associating the token with the modified action by the payment service and the first account without modifying the matrix barcode corresponding to the token.

8. The method of claim 1, wherein the token and the first set of contextual information are received from a third-party application executing on the second electronic device of the second user.

9. The method of claim 1, wherein the token and the first set of contextual information are received from a second application associated with the payment service executing on the second electronic device, and
wherein the second application receives at least the token from a third-party application executing on the second electronic device.

10. The method of claim 1, further comprising, subsequent to causing the user interface to be displayed on the second electronic device, causing a verification message to be delivered to a communication address of the second user,
wherein the payment to the first user is initiated after receiving a confirmation message from the second user verifying the payment to the first user.

11. A payment service computing platform associated with a payment service, the payment service computing platform comprising:
one or more processors; and
one or more computer-readable non-transitory storage media coupled to the one or more processors and comprising instructions which, when executed by the one or more processors, cause the payment service computing platform to:
receive, from an application executing on a first electronic device of a first user of the payment service, a request to generate a matrix barcode, wherein the payment service computing platform has a first database of generated matrix barcodes and a second database of tokens, each of the tokens being configured to be associated with one of the generated matrix barcodes;
select a token from among the tokens in association with the matrix barcode;
receive, from the application, instructions to associate an action with the token corresponding to the matrix barcode, the action involving a first account associated with the first user;
associate the token with the action and the first account associated with the first user;
receive, from a second electronic device of a second user of the payment service, the token and a first set of contextual information, wherein the token is received subsequent to an interaction with the matrix barcode by the second electronic device;
identify the action associated with the first matrix barcode based at least in part on the token and the first set of contextual information;
cause a user interface to be displayed on the second electronic device, wherein the user interface comprises one or more interface elements for collecting payment information from the second user for initiating a payment to the first user;
receive the payment information of the second user; and
initiate the payment to the first user based at least in part on the payment information of the second user.

12. The payment service computing platform of claim 11, wherein the user interface is customized prior to display on the second electronic device based at least in part on the first set of contextual information or information embedded within the matrix barcode.

13. The payment service computing platform of claim 11, wherein the action is further associated with a specified time,
wherein the first set of contextual information comprises a current time, and
wherein identifying the action associated with the first matrix barcode based at least in part on the token and the first set of contextual information comprises comparing the current time and the specified time.

14. The payment service computing platform of claim 11, wherein the action is further associated with a specified location,
wherein the first set of contextual information comprises a current location associated with the second electronic device, and
wherein identifying the action associated with the first matrix barcode based at least in part on the token and the first set of contextual information comprises comparing the current location and the specified location.

15. The payment service computing platform of claim 11, wherein the instructions, when executed by the one or more processors further cause the payment service computing platform to:
associate the token with at least one additional action by the payment service involving the first account,
wherein the action and each at least one additional action is associated with respective contextual information, and
wherein identifying the action associated with the first matrix barcode comprises selecting the action based on comparison of the first set of contextual information and the respective contextual information associated with the action and each at least one additional action.

16. One or more computer-readable non-transitory storage media comprising instructions that, when executed by one or more processors of a payment service computing platform associated with a payment service, cause the payment service computing platform to:
receive, from an application executing on a first electronic device of a first user of the payment service, a request to generate a matrix barcode, wherein the payment service computing platform has a first database of generated matrix barcodes and a second database of tokens, each of the tokens being configured to be associated with one of the generated matrix barcodes;
select a token from among the tokens in association with the matrix barcode;
receive, from the application, instructions to associate an action with the token corresponding to the matrix barcode, the action involving a first account associated with the first user;
associate the token with the action and the first account associated with the first user;
receive, from a second electronic device of a second user of the payment service, the token and a first set of contextual information, wherein the token is received subsequent to an interaction with the matrix barcode by the second electronic device;
identify the action associated with the first matrix barcode based at least in part on the token and the first set of contextual information;
cause a user interface to be displayed on the second electronic device, wherein the user interface comprises one or more interface elements for collecting payment information from the second user for initiating a payment to the first user;
receive the payment information of the second user; and
initiate the payment to the first user based at least in part on the payment information of the second user.

17. The one or more computer-readable non-transitory storage media of claim 16, wherein the user interface is customized prior to display on the second electronic device based at least in part on the first set of contextual information or information embedded within the matrix barcode.

18. The one or more computer-readable non-transitory storage media of claim 16, wherein the action is further associated with a specified time,
wherein the first set of contextual information comprises a current time, and
wherein identifying the action associated with the first matrix barcode based at least in part on the token and the first set of contextual information comprises comparing the current time and the specified time.

19. The one or more computer-readable non-transitory storage media of claim 16, wherein the action is further associated with a specified location,
wherein the first set of contextual information comprises a current location associated with the second electronic device, and
wherein identifying the action associated with the first matrix barcode based at least in part on the token and the first set of contextual information comprises comparing the current location and the specified location.

20. The one or more computer-readable non-transitory storage media of claim 16, wherein the instructions, when executed by the one or more processors of the payment service computing platform, further cause the payment service computing platform to:
associate the token with at least one additional action by the payment service involving the first account, wherein the action and each at least one additional action is associated with respective contextual information, and wherein identifying the action associated with the first matrix barcode comprises selecting the action based on comparison of the first set of contextual information and the respective contextual information associated with the action and each at least one additional action.

\* \* \* \* \*